(12) United States Patent
Basu Mallick et al.

(10) Patent No.: US 11,678,217 B2
(45) Date of Patent: *Jun. 13, 2023

(54) EFFICIENT UPLINK SCHEDULING MECHANISMS FOR DUAL CONNECTIVITY

(71) Applicant: Sun Patent Trust, New York, NY (US)

(72) Inventors: Prateek Basu Mallick, Langen (DE); Joachim Loehr, Wiesbaden (DE); Hidetoshi Suzuki, Kanagawa (JP)

(73) Assignee: Sun Patent Trust, New York, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/370,864

(22) Filed: Jul. 8, 2021

(65) Prior Publication Data

US 2021/0337424 A1    Oct. 28, 2021

Related U.S. Application Data

(63) Continuation of application No. 16/850,475, filed on Apr. 16, 2020, now Pat. No. 11,096,084, which is a
(Continued)

(30) Foreign Application Priority Data

Sep. 27, 2013  (EP) .................................... 13004707
Dec. 20, 2013  (EP) .................................... 13198976

(51) Int. Cl.
*H04W 28/08*     (2023.01)
*H04W 28/02*     (2009.01)
(Continued)

(52) U.S. Cl.
CPC ....... *H04W 28/0278* (2013.01); *H04W 16/32* (2013.01); *H04W 28/085* (2013.01);
(Continued)

(58) Field of Classification Search
None
See application file for complete search history.

(56) References Cited

U.S. PATENT DOCUMENTS 7,873,006 B2   1/2011  Yi et al.
7,894,395 B2   2/2011  Yi et al.
(Continued)

FOREIGN PATENT DOCUMENTS

EP    2 568 759 A1    3/2013
JP    2010-519845 A   6/2010
(Continued)

OTHER PUBLICATIONS

3GPP TR 36.842 V0.2.0, "3rd Generation Partnership Project; Technical Specification Group Radio Access Network; Evolved Universal Terrestrial Radio Access Network (E-UTRA); Study on Small Cell Enhancements for E-UTRA and E-UTRAN—Higher layer aspects (Release 12)," May 2013, 38 pages.
(Continued)

*Primary Examiner* — Robert M Morlan
(74) *Attorney, Agent, or Firm* — Seed IP Law Group LLP

(57) ABSTRACT

The present disclosure mainly relates to improvements for the buffer status reporting and the logical channel prioritization procedures performed in the UE, in scenarios where the UE is in dual connectivity and the PDCP layer of the UE is shared in the uplink for MeNB and SeNB. According to the present disclosure, a ratio is introduced according to which the buffer values for the PDCP are split in the UE between the SeNB and the MeNB according to said ratio.

12 Claims, 12 Drawing Sheets

Related U.S. Application Data continuation of application No. 16/440,029, filed on Jun. 13, 2019, now Pat. No. 10,667,171, which is a continuation of application No. 15/851,631, filed on Dec. 21, 2017, now Pat. No. 10,368,266, which is a continuation of application No. 15/024,751, filed as application No. PCT/JP2014/004323 on Aug. 22, 2014, now Pat. No. 9,883,419.

(51) Int. Cl.
| | |
|---|---|
| H04W 28/082 | (2023.01) |
| H04W 72/21 | (2023.01) |
| H04W 16/32 | (2009.01) |
| H04W 84/04 | (2009.01) |
| H04W 80/02 | (2009.01) |
| H04W 80/06 | (2009.01) |

(52) U.S. Cl.
CPC ............ *H04W 72/21* (2023.01); *H04W 80/02* (2013.01); *H04W 80/06* (2013.01); *H04W 84/045* (2013.01)

(56) References Cited

U.S. PATENT DOCUMENTS

| | | |
|---|---|---|
| 9,264,930 B2 | 2/2016 | Damnjanovic et al. |
| 9,392,515 B2 | 7/2016 | Wang et al. |
| 9,572,185 B2 | 2/2017 | Sivanesan et al. |
| 9,648,514 B2 | 5/2017 | Blankenship et al. |
| 9,883,419 B2 | 1/2018 | Basu Mallick et al. |
| 2010/0046456 A1 | 2/2010 | Yi et al. |
| 2010/0118796 A1 | 5/2010 | Yi et al. |
| 2010/0130219 A1 | 5/2010 | Cave et al. |
| 2010/0232387 A1 | 9/2010 | Marchand et al. |
| 2014/0056243 A1 | 2/2014 | Pelletier et al. |
| 2016/0066241 A1 | 3/2016 | Wu et al. |
| 2016/0088647 A1 | 3/2016 | Yi et al. |
| 2017/0150447 A1 | 5/2017 | Kim et al. |

FOREIGN PATENT DOCUMENTS

| | | |
|---|---|---|
| JP | 6635350 B2 | 1/2020 |
| KR | 10-2012-0025621 A | 3/2012 |
| WO | 2013/116988 A1 | 8/2013 |
| WO | 2015/012545 A1 | 1/2015 |

OTHER PUBLICATIONS

3GPP TR 36.932 V1.0.0, "3rd Generation Partnership Project; Technical Specification Group Radio Access Network; Scenarios and Requirements for Small Cell Enhancements for E-UTRA and EUTRAN (Release 12)," Dec. 2012, 14 pages.
3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.
3GPP TS 36.321 V10.4.0, "3rd Generation Partnership Project; Technical Specification Group Radio Access Network; Evolved Universal Terrestrial Radio Access (E-UTRA); Medium Access Control (MAC) protocol specification (Release 10)," Dec. 2011, 54 pages.
3GPP TS 36.322 V10.0.0, "3rd Generation Partnership Project; Technical Specification Group Radio Access Network; Evolved Universal Terrestrial Radio Access (E-UTRA); Radio Link Control (RLC) protocol specification (Release 10)," Dec. 2010, 39 pages.
3GPP TS 36.323 V1 1.0.0, "3rd Generation Partnership Project; Technical Specification Group Radio Access Network; Evolved Universal Terrestrial Radio Access (E-UTRA); Packet Data Convergence Protocol (PDCP) specification (Release 11)," Sep. 2012, 27 pages.
3GPP TS 36.331 V10.10.0, "3rd Generation Partnership Project; Technical Specification Group Radio Access Network; Evolved Universal Terrestrial Radio Access (E-UTRA); Radio Resource Control (RRC); Protocol specification (Release 10)," Jun. 2013, 307 pages.
CATT, "Discussion on Xn interface between MeNB and SeNB," R3-131221, Agenda Item: 20.2, 3GPP TSG RAN WG3#81, Barcelona, Spain, Aug. 19-23, 2013, 3 pages.
Chinese Office Action, dated May 31, 2018, for corresponding Chinese Application No. 201480052941.8, 24 pages. (With English Translation).
Ericsson (Rapporteur), "Summary of email discussion [81bis#18][LTE/SCE-HL] CP protocol and architecture alternatives," R2-131673, Agenda Item: 7.2.2.2, 3GPP TSG-RAN WG2 #82, Fukuoka, Japan, May 20-24, 2013, 35 pages.
Ericsson, "Comparison of intra-bearer UP architectures," R2-133603 (Revision of R2-133416), Agenda Item: 7.2.1, 3GPP TSG-RAN WG2 Meeting #83bis, Ljubljana, Slovenia, Oct. 7-11, 2013, 8 pages.
Extended European Search Report dated Aug. 23, 2016, for corresponding EP Application No. 14848444.7-1857 / 3050379, 15 pages.
Intel Corporation, "Dual connectivity for UEs supporting one UL CC," R2-131410, Agenda Item: 7.2, 3GPP TSG RAN WG2 Meeting #81bis, Chicago, USA, Apr. 15-19, 2013, 7 pages.
Intel Corporation, "Impacts of Splitting a Single EPS Bearer between Two (or more) eNBs," R2-131529, Agenda Item: 7.2, 3GPP TSG RAN WG2 Meeting #81bis, Chicago, USA, Apr. 15-19, 2013, 10 pages.
Intel Corporation, "MAC layer aspects for dual connectivity," R2-132817, 3GPP TSG RAN WG2 Meeting #83, Agenda item: 7.2.4, Barcelona, Spain, Aug. 19-23, 2013, 2 pages.
Intel Corporation, "Throughput evaluation and comparison of with and without UP bearer split," R2-132859, 3GPP TSG RAN WG2 Meeting #83, Agenda item: 7.2.2, Barcelona, Spain, Aug. 19-23, 2013, 8 pages.
InterDigital Communications, "User Plane Architecture for Dual-Connectivity," R2-131327, Agenda Item: 7.2, 03GPP TSG-RAN WG2 #81bis, Chicago, USA, Apr. 15-19, 2013, 7 pages.
International Search Report dated Oct. 7, 2014, for corresponding International Application No. PCT/JP2014/004323, 2 pages.
LG Electronics Inc., "Dual Connectivity Architecture for Small Cell Enhancement," R2-131218, Agenda Item: 7.2, 3GPP TSG-RAN WG2 #81bis, Chicago, USA, Apr. 15-19, 2013, 2 pages.
LG Electronics Inc., "UP Radio Procotol for Dual Connecivity," R2-131231, Agenda Item: 7.2, 3GPP TSG-RAN2 Meeting #81bis, Chicago, USA, Apr. 15-19, 2013, 7 pages.
NTT Docomo, Inc., "Discussion on U-plane architecture for dual connectivity," R2-130324, Agenda Item: 7.2, 3GPP TSG-RAN WG2 #81, St. Julian's, Malta, Jan. 28-Feb. 1, 2013, 6 pages.
NSN, Nokia Corporation, "BSR and SR for dual connectivity," R2-133855, 3GPP TSG-RAN WG2 Meeting #84, Agenda item: 7.2.4, San Francisco, USA, Nov. 11-15, 2013, 5 pages.
Panasonic, "BSR Reporting Options for Dual Connectivity," R2-133935, 3GPP TSG RAN WG2 #84, Agenda Item: 7.2.4, San Francisco, USA, Nov. 11-15, 2013, 5 pages.
Panasonic, "Logical channel prioritization for dual connectivity," R2-133943, 3GPP TSG RAN WG2 Meeting #84, Agenda Item: 7.2.4, San Francisco, USA, Nov. 11-15, 2013, 4 pages.
Pantech, "Considerations on signaling for separated DRA function," R2-132503, Agenda Item: 7.2.4, 3GPP TSG RAN WG2 Meeting #83, Barcelona, Spain, Aug. 19-23, 2013, 5 pages.
Research In Motion et al., "Discussion on Protocol Stack Support in Small Cell eNB," R2-131954, Agenda Item: 7.2.2.1, 3GPP TSG RAN WG2 Meeting #81bis, Fukuoka, Japan, May 20-24, 2013, 7 pages.
Renesas Mobile Europe, "On protocol stack impacts of dual connectivity," R2-132405, 3GPP TSG-RAN WG2 Meeting #83, Agenda Item: 7.2.4, Barcelona, Spain, Aug. 19-23, 2013, 6 pages.
Renesas Mobile Europe, "User plane details related to the SCE user plane architecture selection," R2-133310, 3GPP TSG-RAN WG2 Meeting #83-bis, Agenda Item: 7.2.3, Ljubljana, Slovenia, Oct. 7-11, 2013, 3 pages.

(56) References Cited

OTHER PUBLICATIONS

Samsung, "Discussion on bearer split options," R2-132109, Agenda Item: 7.2.1, 3GPP TSG-RAN WG2 Meeting #82, Fukuoka, Japan, May 20-24, 2013, 7 pages.
Samsung, "Performance analysis on SCE UP architecture," R2-132552, Agenda Item: 7.2.4, 3GPP TSG-RAN WG2 Meeting #83, Barcelona, Spain, Aug. 19-23, 2013, 6 pages.
Sesia et al., "LTE—The UMTS Long Term Evolution—From Theory to Practice," Second Edition, Jul. 2011, pp. 34-37 (4 pages).
ZTE Corporation, "Consideration on Dual Connectivity" R2-130136, Agenda Item: 7.2, 3GPP TSG-RAN2 Meeting #81, St. Julian's, Malta, Jan. 28-Feb. 1, 2013, 4 pages.

[Fig. 3]

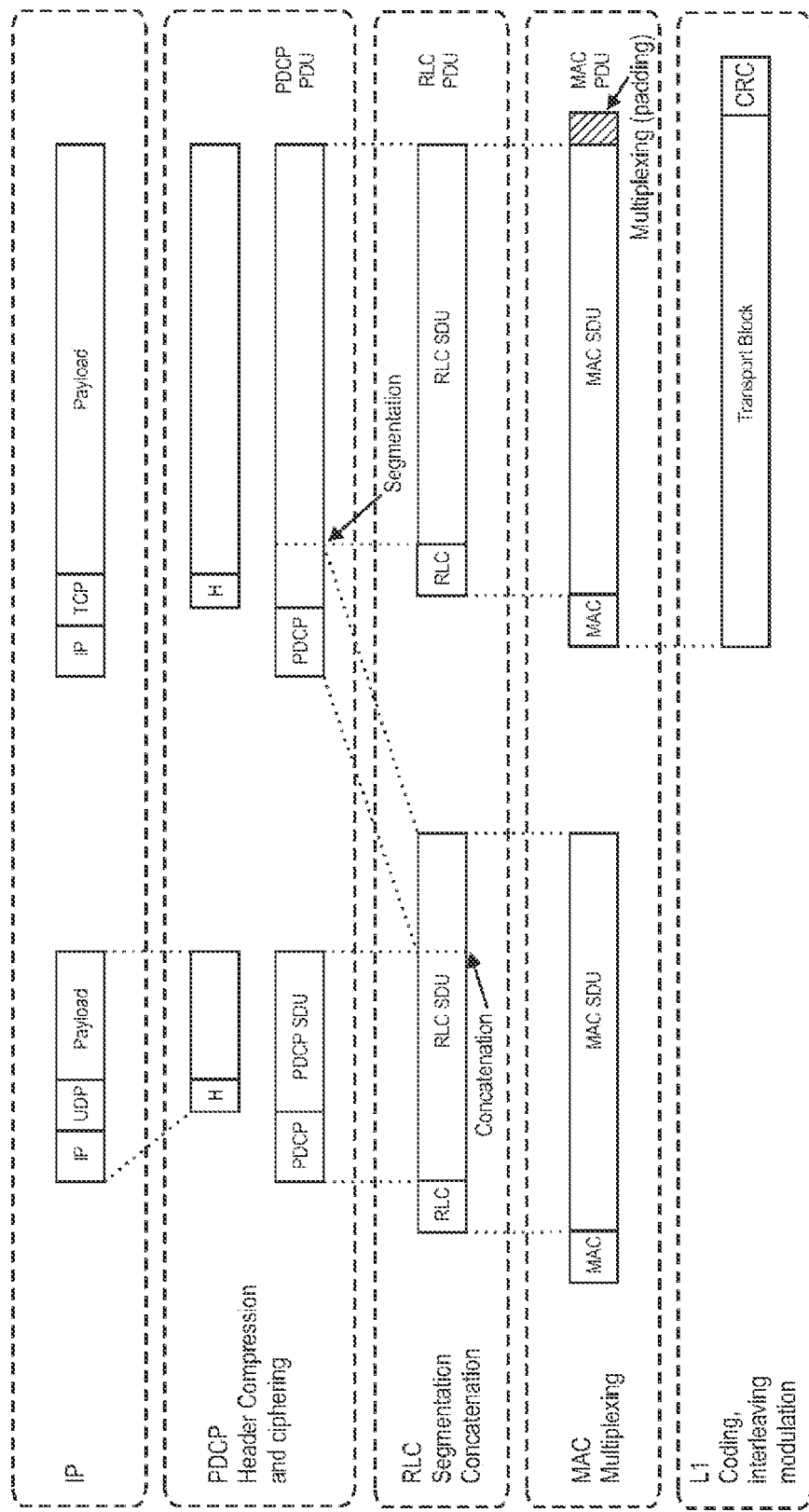

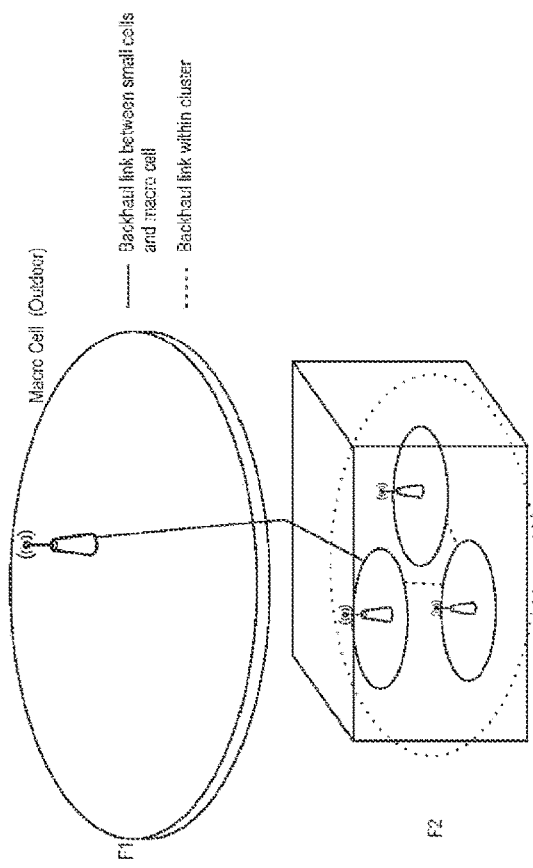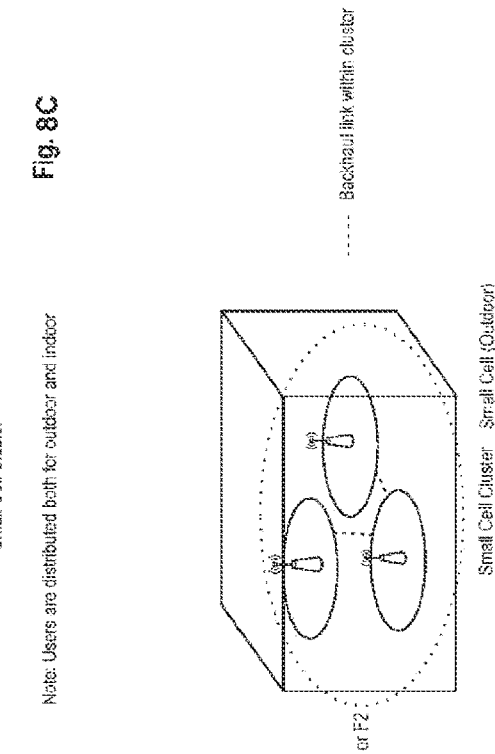
Fig. 8A
Fig. 8C
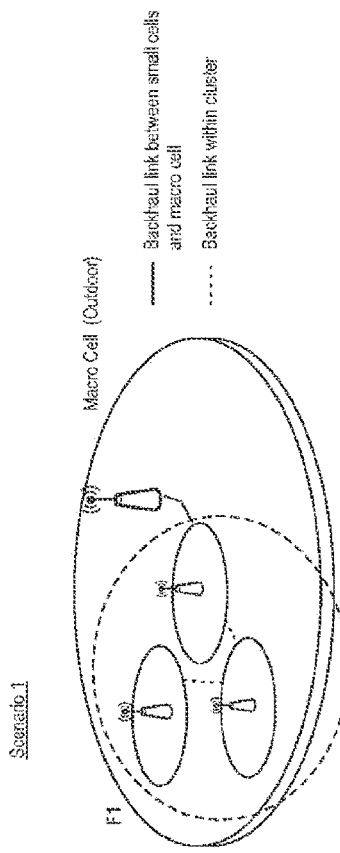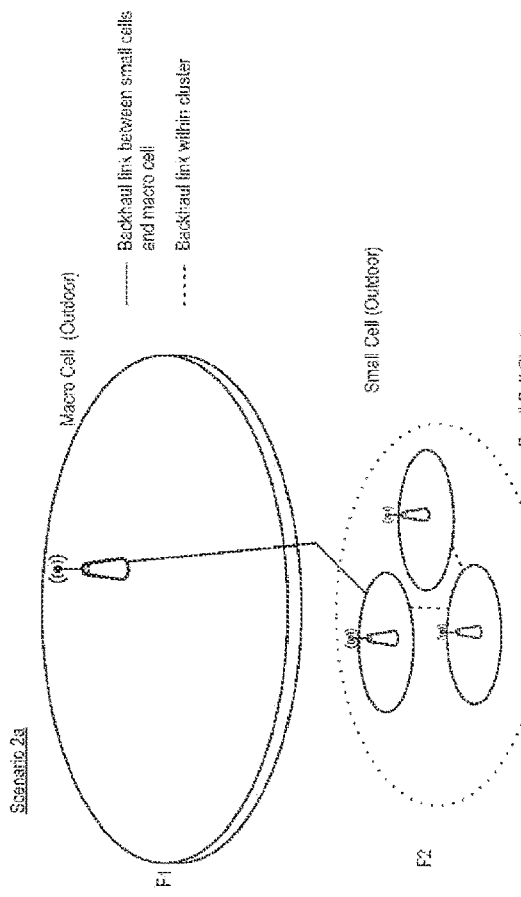
Fig. 8B
Fig. 8D

Fig. 17

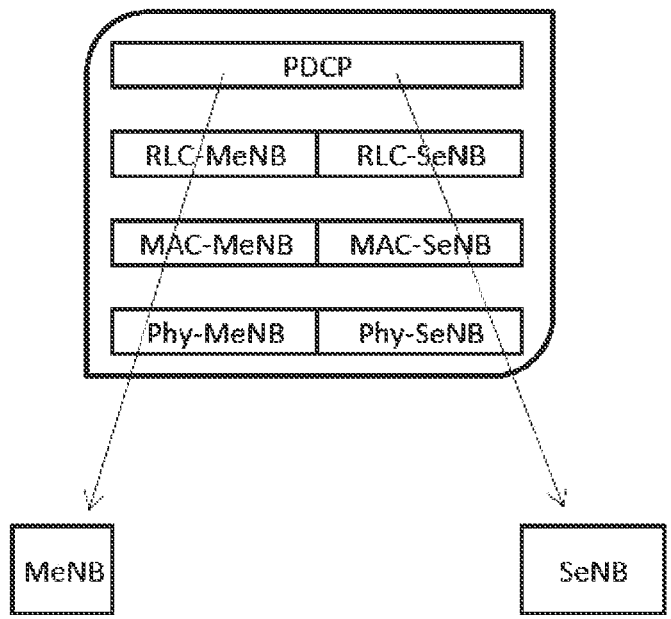

Fig. 18

| | | | | | |
|---|---|---|---|---|---|
| | Ratio (MeNB:SeNB) | 1:4 | | | |
| | | | | | |
| MeNB | Logical Channel Group | LCG1 | LCG2 | | |
| | Logical Channel | LC1 | LC2 | | LC3 |
| | Buffer Occupancy in PDCP | 100 | 80 | | 60 |
| | Buffer Occupancy in RLC | 10 | 11 | | 12 |
| | | | | Split-Bearer | |
| SeNB | Logical Channel Group | LCG1 | LCG2 | | |
| | Logical Channel | LC4 | LC2 | | |
| | Buffer Occupancy in PDCP | 120 | - | | |
| | Buffer Occupancy in RLC | 13 | 14 | | |
| | | | | | |
| | | LCG1 | LCG2 | | |
| PDCP BO for reporting | | = 100 | = 76 = 80*(1/5) + 60 | | |
| BSR to be reported to MeNB (PDCP+RLC) | | = 110 = 100+10 | = 99 = 76+11+12 | | |
| | | | | | |
| | | LCG1 | LCG2 | | |
| PDCP BO for reporting | | = 120 | = 64 = 80*(4/5) | | |
| BSR to be reported to SeNB (PDCP+RLC) | | = 133 = 120+13 | = 78 = 64+14 | | |

EFFICIENT UPLINK SCHEDULING MECHANISMS FOR DUAL CONNECTIVITY

BACKGROUND

Technical Field

The present disclosure relates to methods for communication between a mobile station and a base station. In particular, it relates to an improved method for managing resource allocation for a mobile station, preferably for a mobile station capable of simultaneously connecting to more than one cell. The present disclosure is also providing the mobile station for participating in the methods described herein.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive. In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE. The work item (WI) specification on Long-Term Evolution (LTE) called Evolved UMTS Terrestrial Radio Access (UTRA) and UMTS Terrestrial Radio Access Network (UTRAN) is finalized as Release 8 (Rel. 8 LTE). The LTE system represents efficient packet based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

LTE Architecture

The overall architecture is shown in FIG. 1 and a more detailed representation of the E-UTRAN architecture is given in FIG. 2. The E-UTRAN consists of eNBs, providing the E-UTRA user plane (PDCP/RLC/MAC/PHY) and control plane (RRC) protocol terminations towards the UE. The eNB hosts the Physical (PHY), Medium Access Control (MAC), Radio Link Control (RLC), and Packet data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNBs. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g., parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the Sha interface towards the home HSS for roaming UEs Component Carrier Structure in LTE The downlink component carrier of a 3GPP LTE system is subdivided in the time-frequency domain in so-called subframes. In 3GPP LTE each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N^{DL}_{RB}*N^{RB}_{sc}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N^{DL}_{symb}$ consecutive OFDM symbols in the time domain (e.g., 7 OFDM symbols) and $N^{RB}_{sc}$ consecutive subcarriers in the frequency domain as exemplified in FIG. 4 (e.g., 12 subcarriers for a component carrier). In 3GPP LTE (Release 8), a physical resource block thus consists of $N^{DL}_{symb}*N^{RB}_{sc}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N^{RB}_{sc}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

General Overview of the OSI Layer

FIG. 4 provides a brief overview of the OSI model on which the further discussion of the LTE architecture is based.

The Open Systems Interconnection Reference Model (OSI Model or OSI Reference Model) is a layered abstract description for communication and computer network protocol design. The OSI model divides the functions of a system into a series of layers. Each layer has the property that it only uses the functions of the layer below, and only exports functionality to the layer above. A system that implements protocol behavior consisting of a series of these layers is known as a 'protocol stack' or 'stack'. Its main feature is in the junction between layers which dictates the specifications on how one layer interacts with another. This means that a layer written by one manufacturer can operate with a layer from another. For the purposes of the present disclosure, only the first three layers will be described in more detail below.

The physical layer or layer 1's main purpose is the transfer of information (bits) over a specific physical medium (e.g., coaxial cables, twisted pairs, optical fibers, air interface, etc.). It converts or modulates data into signals (or symbols) that are transmitted over a communication channel.

The purpose of the data link layer (or Layer 2) is to shape the information flow in a way compatible with the specific physical layer by breaking up the input data into data frames (Segmentation And Re-assembly (SAR) functions). Furthermore, it may detect and correct potential transmission errors by requesting a retransmission of a lost frame. It typically provides an addressing mechanism and may offer flow control algorithms in order to align the data rate with the receiver capacity. If a shared medium is concurrently used by multiple transmitters and receivers, the data link layer typically offers mechanisms to regulate and control access to the physical medium.

As there are numerous functions offered by the data link layer, the data link layer is often subdivided into sublayers (e.g., RLC and MAC sublayers in UMTS). Typical examples of Layer 2 protocols are PPP/HDLC, ATM, frame relay for fixed line networks and RLC, LLC or MAC for wireless systems. More detailed information on the sublayers PDCP, RLC and MAC of layer 2 is given later.

The network layer or Layer 3 provides the functional and procedural means for transferring variable length packets from a source to a destination via one or more networks while maintaining the quality of service requested by the transport layer. Typically, the network layer's main purposes are inter alia to perform network routing, network fragmentation and congestion control functions. The main examples of network layer protocols are the IP Internet Protocol or X.25.

With respect to Layers 4 to 7 it should be noted that depending on the application and service it is sometimes difficult to attribute an application or service to a specific layer of the OSI model since applications and services operating above Layer 3 often implement a variety of functions that are to be attributed to different layers of the OSI model. Therefore, especially in TCP(UDP)/IP based networks, Layer 4 and above is sometimes combined and forms a so-called "application layer".

Layer Services and Data Exchange

In the following the terms service data unit (SDU) and protocol data unit (PDU) as used herein are defined in connection with FIG. 5. In order to formally describe in a generic way the exchange of packets between layers in the OSI model, SDU and PDU entities have been introduced. An SDU is a unit of information (data/information block) transmitted from a protocol at layer N+1 that requests a service from a protocol located at layer N via a so-called service access point (SAP). A PDU is a unit of information exchanged between peer processes at the transmitter and at the receiver of the same protocol located at the same layer N.

A PDU is generally formed by a payload part consisting of the processed version of the received SDU(s) preceded by a layer N specific header and optionally terminated by a trailer. Since there is no direct physical connection (except for Layer 1) between these peer processes, a PDU is forwarded to the layer N−1 for processing. Therefore, a layer N PDU is from a layer N−1 point of view an SDU.

LTE Layer 2—User Plane and Control Plane Protocol Stack

The LTE layer 2 user-plane/control-plane protocol stack comprises three sublayers as shown in FIG. 6, PDCP, RLC and MAC. As explained before, at the transmitting side, each layer receives a SDU from a higher layer for which the layer provides a service and outputs a PDU to the layer below. The RLC layer receives packets from the PDCP layer. These packets are called PDCP PDUs from a PDCP point of view and represent RLC SDUs from an RLC point of view. The RLC layer creates packets which are provided to the layer below, i.e., the MAC layer. The packets provided by RLC to the MAC layer are RLC PDUs from an RLC point of view and MAC SDUs from a MAC point of view.

At the receiving side, the process is reversed, with each layer passing SDUs up to the layer above, where they are received as PDUs.

While the physical layer essentially provides a bitpipe, protected by turbo-coding and a cyclic redundancy check (CRC), the link-layer protocols enhance the service to upper layers by increased reliability, security and integrity. In addition, the link layer is responsible for the multi-user medium access and scheduling. One of the main challenges for the LTE link-layer design is to provide the required reliability levels and delays for Internet Protocol (IP) data flows with their wide range of different services and data rates. In particular, the protocol over-head must scale. For example, it is widely assumed that voice over IP (VoIP) flows can tolerate delays on the order of 100 ms and packet losses of up to one percent. On the other hand, it is well-known that TCP file downloads perform better over links with low bandwidth-delay products. Consequently, downloads at very high data rates (e.g., 100 Mb/s) require even lower delays and, in addition, are more sensitive to IP packet losses than VoIP traffic.

Overall, this is achieved by the three sublayers of the LTE link layer that are partly intertwined.

The Packet data Convergence Protocol (PDCP) sublayer is responsible mainly for IP header compression and ciphering. In addition, it supports lossless mobility in case of inter-eNB handovers and provides integrity protection to higher layer-control protocols.

The radio link control (RLC) sublayer comprises mainly ARQ functionality and supports data segmentation and concatenation. The latter two minimize the protocol overhead independent of the data rate.

Finally, the medium access control (MAC) sublayer provides HARQ and is responsible for the functionality that is required for medium access, such as scheduling operation and random access. FIG. 7 exemplary depicts the data flow of an IP packet through the link-layer protocols down to the physical layer. The figure shows that each protocol sublayer adds its own protocol header to the data units.

Packet Data Convergence Protocol (PDCP)

The PDCP layer processes Radio Resource Control (RRC) messages in the control plane and IP packets in the user plane. Depending on the radio bearer characteristics and the mode of the associated RLC entity (AM, UM, TM), the main functions performed by a PDCP entity of the PDCP layer are:
- header compression and decompression (e.g., using Robust Header Compression (ROHC) for user plane data (DRB)
- Security functions:
  - Ciphering and deciphering for user plane and control plane data (for SRB and DRB)
  - Integrity protection and verification for control plane data (for SRB)
- Maintenance of PDCP sequence numbers for SRB and DRB
- Handover support functions:
  - In-sequence delivery and reordering of PDUs for the layer above at handover for AM DRB;
  - Lossless handover for user plane data mapped on RLC Acknowledged Mode (AM); including Status Reporting for AM DRBs and duplicate elimination of lower layers SDUs for AM DRB
- Discard for user plane data due to timeout (for SRB and DRB).

The PDCP layer manages data streams in the user plane, as well as in the control plane, only for the radio bearers using either a Dedicated Control Channel (DCCH) or a Dedicated Transport Channel (DTCH). The architecture of the PDCP layer differs for user plane data and control plane data. Two different types of PDCP PDUs are defined in LTE: PDCP data PDUs and PDCP Control PDUs. PDCP data PDUs are used for both control and user plane data. PDCP Control PDUs are only used to transport the feedback information for header compression, and for PDCP status reports which are used in case of handover and hence are only used within the user plane.

Buffer Status Reporting

The Buffer Status reporting procedure is used to provide the serving eNB with information about the amount of data available for transmission in the UL buffers of the UE. RRC controls BSR reporting by configuring the two timers periodicBSR-Timer and retxBSR-Timer and by, for each logical channel, optionally signalling logicalChannelGroup which allocates the logical channel to an LCG.

For the Buffer Status reporting procedure, the UE shall consider all radio bearers which are not suspended and may consider radio bearers which are suspended.

A Buffer Status Report (BSR) shall be triggered if any of the following events occur:
- UL data, for a logical channel which belongs to a LCG, becomes available for transmission in the RLC entity or in the PDCP entity (the definition of what data shall be considered as available for transmission is specified in section 5.4 of document TS36.321-a.4.0), and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
- UL resources are allocated and the number of padding bits is equal to or larger than the size of the Buffer Status Report MAC control element plus its subheader, in which case the BSR is referred below to as "Padding BSR";
- retxBSR-Timer expires and the UE has data available for transmission for any of the logical channels which belong to a LCG, in which case the BSR is referred below to as "Regular BSR";
- periodicBSR-Timer expires, in which case the BSR is referred below to as "Periodic BSR".

For Regular and Periodic BSR:
if more than one LCG has data available for transmission in the TTI where the BSR is transmitted: report Long BSR;
else report Short BSR.

For Padding BSR:
if the number of padding bits is equal to or larger than the size of the Short BSR plus its subheader but smaller than the size of the Long BSR plus its subheader:
  if more than one LCG has data available for transmission in the TTI where the BSR is transmitted: report Truncated BSR of the LCG with the highest priority logical channel with data available for transmission;
  else report Short BSR.
else if the number of padding bits is equal to or larger than the size of the Long BSR plus its subheader: report Long BSR.

If the buffer Status reporting procedure determines that at least one BSR has been triggered and not cancelled:
if the UE has UL resources allocated for new transmission for this TTI:
instruct the Multiplexing and Assembly procedure to generate the BSR MAC control element(s);
start or restart periodicBSR-Timer except when all the generated BSRs are Truncated BSRs;
start or restart retxBSR-Timer.
else if a Regular BSR has been triggered:
if an uplink grant is not configured or the Regular BSR was not triggered due to data becoming available for transmission for a logical channel for which logical channel SR masking (logicalChannelSR-Mask) is setup by upper layers:

a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE: A Padding BSR is not allowed to cancel a triggered Regular/Periodic BSR. A Padding BSR is triggered for a specific MAC PDU only and the trigger is cancelled when this MAC PDU has been built.

Logical Channel Prioritization

The Logical Channel Prioritization (LCP) procedure is applied when a new transmission is performed.

RRC controls the scheduling of uplink data by signalling for each logical channel:

priority where an increasing priority value indicates a lower priority level, prioritisedBitRate which sets the Prioritized Bit Rate (PBR), bucketSizeDuration which sets the Bucket Size Duration (BSD).

The UE shall maintain a variable Bj for each logical channel j. Bj shall be initialized to zero when the related logical channel is established, and incremented by the product PBR×TTI duration for each TTI, where PBR is Prioritized Bit Rate of logical channel j. However, the value of Bj can never exceed the bucket size and if the value of Bj is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:

The UE shall allocate resources to the logical channels in the following steps:

Step 1: All the logical channels with Bj>0 are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: the UE shall decrement Bj by the total size of MAC SDUs served to logical channel j in Step 1

NOTE: The value of Bj can be negative.

Step 3: if any resources remain, all the logical channels are served in a strict decreasing priority order (regardless of the value of Bj) until either the data for that logical channel or the UL grant is exhausted, whichever comes first. Logical channels configured with equal priority should be served equally.

The UE shall also follow the rules below during the scheduling procedures above:

The UE should not segment an RLC SDU (or partially transmitted SDU or retransmitted RLC PDU) if the whole SDU (or partially transmitted SDU or retransmitted RLC PDU) fits into the remaining resources;

if the UE segments an RLC SDU from the logical channel, it shall maximize the size of the segment to fill the grant as much as possible;

UE should maximize the transmission of data.

The UE shall not transmit data for a logical channel corresponding to a radio bearer that is suspended (the conditions for when a radio bearer is considered suspended are defined in TS 36.331).

For the Logical Channel Prioritization procedure, the UE shall take into account the following relative priority in decreasing order:

MAC control element for C-RNTI or data from UL-CCCH;

MAC control element for BSR, with exception of BSR included for padding;

MAC control element for PHR or Extended PHR;

data from any Logical Channel, except data from UL-CCCH;

MAC control element for BSR included for padding.

When the UE is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when UE is requested to transmit multiple MAC PDUs in one TTI.

Further Advancements for LTE (LTE-A and 3GPP Rel. 12)

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the study item description on "Further Advancements for E-UTRA (LTE-Advanced)" was approved in the 3GPP. The study item covers technology components to be considered for the evolution of E-UTRA, e.g., to fulfill the requirements on IMT-Advanced.

Further, in Rel. 12 one major technology components which are currently under consideration for LTE is described in the following.

Small Cells

Explosive demands for mobile data are driving changes in how mobile operators will need to respond to the challenging requirements of higher capacity and improved quality of user experience (QoE). Currently, fourth generation wireless access systems using Long Term Evolution (LTE) are being deployed by many operators worldwide in order to offer faster access with lower latency and more efficiency than 3G/3.5G. Nevertheless, the anticipated future traffic growth is so tremendous that there is a vastly increased need for further network densification to handle the capacity requirements, particularly in high traffic areas (hot spot areas) that generate the highest volume of traffic. Network densification—increasing the number of network nodes, and thereby bringing them physically closer to the user terminals—is a key to improving traffic capacity and extending the achievable user-data rates of a wireless communication system. In addition to straightforward densification of a macro deployment, network densification can be achieved by the deployment of complementary low-power nodes respectively small cells under the coverage of an existing macro-node layer. In such a heterogeneous deployment, the low-power nodes provide very high traffic capacity and very high user throughput locally, for example in indoor and outdoor hotspot positions.

Meanwhile, the macro layer ensures service availability and QoE over the entire coverage area. In other words, the layer containing the low-power nodes can also be referred to as providing local-area access, in contrast to the wide-area-covering macro layer. The installation of low-power nodes respectively small cells as well as heterogeneous deployments has been possible since the first release of LTE. In this regard, a number of solutions have been specified in recent releases of LTE (i.e., Release 10/11). More specifically, these releases introduced additional tools to handle inter-layer interference in heterogeneous deployments. In order to further optimize performance and provide cost/energy-efficient operation, small cells require further enhancements and in many cases need to interact with or complement existing macrocells. Such solutions will be investigated during the further evolution of LTE-Release 12 and beyond. In particular further enhancements related to low-power nodes and heterogeneous deployments will be considered under the umbrella of the new Rel-12 study item (SI) "Study on Small Cell Enhancements for E-UTRA and E-UTRAN". Some of these activities will focus on achieving an even higher degree of interworking between the macro and low-power layers, including different forms of macro assistance to the low-power layer and dual-layer connectivity. Dual connectivity implies that the device has simultaneous connections to both macro and low-power layers.

Deployment Scenarios within Small Cell Enhancement SI

This section describes the deployment scenarios assumed in the study item (SI) on small cell enhancements. In the following scenarios, the backhaul technologies categorized as non-ideal backhaul in TR 36.932 are assumed. Fiber access which can be used to deploy Remote Radio Heads (RRHs) is not assumed in this study. HeNBs are not precluded, but not distinguished from Pico eNBs in terms of deployment scenarios and challenges even though the transmission power of HeNBs is lower than that of Pico eNBs. Following 3 scenarios, illustrated in FIG. 8, are considered:

Scenario #1. Scenario #1 is the deployment scenario where macro and small cells on the same carrier frequency (intra-frequency) are connected via a non-ideal backhaul.

Scenario #2. Scenario #2 is the deployment scenario where macro and small cells on different carrier frequencies (inter-frequency) are connected via a non-ideal backhaul. There are essentially two flavors of scenario #2, which is here referred to as Scenario 2a and Scenario 2b, the difference being that in scenario 2b an indoor small cell deployment is considered.

Scenario #3. Scenario #3 is the deployment scenario where only small cells on one or more carrier frequencies are connected via a non-ideal backhaul.

Depending on the deployment scenario, different challenges/problems exist which need to be further investigated. During the study item phase such challenges have been identified for the corresponding deployment scenario and captured in TS36.842. More details on those challenges/problems can be found there.

In order to resolve the identified challenges which are described in section 5 of TS36.842, the following design goals are taken into account for this study in addition to the requirements specified in TR 36.932.

In terms of mobility robustness: for UEs in RRC CONNECTED, Mobility performance achieved by small cell deployments should be comparable with that of a macro only network.

In terms of increased signalling load due to frequent handover: any new solutions should not result in excessive increase of signalling load towards the CN. However, additional signalling and user plane traffic load caused by small cell enhancements should also be taken into account.

In terms of improving per-user throughput and system capacity: utilizing radio resources across macro and small cells in order to achieve per-user throughput and system capacity similar to ideal backhaul deployments while taking into account QoS requirements should be targeted.

Logical Channel Prioritization (LCP)

The finite radio resource should be allocated and used carefully among the UEs and radio bearers. In the downlink, the eNB is the focal point through which all downlink data flows before being transmitted over the radio interface to each UE. Thus, the eNB can make consistent decisions about which downlink data should be transmitted first. However, in the uplink, each UE makes an individual decision based only on the data in its own buffers and the allocated radio resource. To ensure that each UE makes the best and most consistent decisions in terms of using the allocated radio resource, the Logical Channel Prioritization (LCP) procedure is introduced. The LCP procedure is used for MAC PDU construction by deciding the amount of data from each logical channel and the type of MAC Control Element that should be included in the MAC PDU. By using the LCP procedure, the UE can satisfy the QoS of each radio bearer in the best and most predictable way.

In constructing a MAC PDU with data from multiple logical channels, the simplest and most intuitive method is the absolute priority-based method, where the MAC PDU space is allocated to logical channels in decreasing order of logical channel priority. This is, data from the highest priority logical channel are served first in the MAC PDU, followed by data from the next highest priority logical channel, continuing until the MAC PDU space runs out. Although the absolute priority-based method is quite simple in terms of UE implementation, it sometimes leads to starvation of data from low-priority logical channels. Starvation means that the data from the low-priority logical channels cannot be transmitted because the data from high-priority logical channels take up all the MAC PDU space.

In LTE, a Prioritized Bit Rate (PBR) is defined for each logical channel, in order to transmit data in order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

Constructing a MAC PDU with PBR consists of two rounds. In the first round, each logical channel is served in decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

A MAC PDU may include not only the MAC SDUs from each configured logical channel but also the MAC CE. Except for a Padding BSR, the MAC CE has a higher priority than a MAC SDU from the logical channels because it controls the operation of the MAC layer. Thus, when a MAC PDU is composed, the MAC CE, if it exists, is the first to be included and the remaining space is used for MAC SDUs from the logical channels. Then, if additional space is left and it is large enough to include a BSR, a Padding BSR is triggered and included in the MAC PDU.

The table below shows the priority order considered when generating a MAC PDU. Among the several types of MAC CE and the data from the logical channels, the C-RNTI MAC CE and data from the UL-CCCH have the highest priority. The C-RNTI MAC CE and data from the UL-CCCH are never included in the same MAC PDU. Unlike data from other logical channels, data from the UL-CCCH have higher priority than other MAC CEs. Because the UL-CCCH transports an RRC message using SRB0, UL-CCCH data must have higher priority than other data. Typically, data from the UL-CCCH are transported during the RA procedure and the size of a MAC PDU from the UL-CCCH is limited. The C-RNTI MAC CE is used during the RA procedure by a UE whose existence is known by the eNB. Since the RA procedure is subject to collision, it is important to have a means by which the eNB can identify each UE. Thus, the UE is required to include its C-RNTI as its identity as early as possible during the RA procedure.

TABLE 1

| | Priority |
|---|---|
| Highest | MAC CE for C-RNTI or data from UL-CCCH |
| | MAC CE for BSR, with the exception of BSR included for padding |
| | MAC CE for PHR data from any logical channel, except data from UL-CCCH |
| Lowest | MAC CE for padding BSR |

Priority of MAC CEs and Data from Logical Channels

The following illustrates an example of how LTE MAC multiplexing is performed. In this example, the following are assumed:
  there are three channels: channel 1 is of the highest priority, channel 2 is of middle priority, and channel 3 is of the lowest priority;
  channel 1, channel 2, and channel 3 have been assigned PBR values.

In the first round, each channel is served up to the data amount equivalent to the PBR according to the order of priority. In this first round, a channel without any configured PBR value is not served. In addition, if the amount of data available for the channel is less than the configured value of the PBR, the channel is served up to the data amount that is available in the buffer. Thus, each channel is allocated space in the MAC PDU up to its configured value of PBR.

In the second round, a logical channel is served only when the following three conditions are met:
  after the logical channels of higher priority than the concerned logical channel have been served;
  there is space remaining in the MAC PDU;
  there is data available in the channel's buffer.

Accordingly, if there is remaining space in the PDU, channel 1 is served first. Because the remaining data in the buffer for channel 1 are larger than the remaining space in the MAC PDU, all the remaining space in the MAC PDU is allocated to channel 1. Because there is no more space, channels 2 and 3 are not served in the second round.

The description above is the general principle and is not enforced every time a new MAC PDU is composed. Each MAC SDU corresponds to one RLC PDU and one RLC PDU includes at least 1 byte of RLC PDU header. For each MAC SDU, there exists a corresponding at least 1 byte MAC subheader. Thus, whenever a small amount of data from one logical channel is included in a MAC PDU, it will incur at least 2 bytes of header overhead. If the above multiplexing principle was applied in every MAC PDU, the overall overhead caused by the MAC subheader and the RLC PDU header of every logical channel in a MAC PDU would be huge. Thus, rather than applying the above PBR requirements for every subframe, it is better to meet the PBR requirements for a long time period. To reduce the overhead and to prevent too much segmentation, the token-bucket model with PBR is applied.

In the token-bucket model, each logical channel is associated with two parameters: bucketSizeDuration and prioritizedBitRate. In this model, it is assumed that each logical channel is given a right to transmit a prioritizedBitRate amount of data in every subframe. If a certain logical channel has not fully used the right to transmit its prioritizedBitRate amount of data in a certain subframe, the remaining right can be used in another subframe. The right to transmit can be accumulated up to a (prioritizedBitRate× bucketSizeDuration) amount of data. When some data for the logical channel are included in a MAC PDU, the right to transmit is decreased by the amount of data included in the MAC PDU. To prevent a certain logical channel from accumulating too much right to transmit, the parameter bucketSizeDuration sets the limit up to which a logical channel can accumulate the right to transmit. Through this token-bucket model, the UE can meet the PBR principle on average for a longer time period, not per subframe.

In the following, an example of logical channel prioritization is provided. Here, for the given logical channel, it was assumed that bucketSizeDuration was 4 ms (subframes) and prioritizedBitRate was 1 Kb/ms. Thus, the logical channel cannot accumulate more than 4 Kb worth of right to transmit. In other words, even if data from the logical channel have not been transmitted for a long time, the maximum number of bits that the logical channel can transmit is 4 Kb. In the example, the logical channel has not transmitted any data for the 1st subframe to the 5th subframe. But, because of the limited size of the token bucket, the maximum token accumulated by the logical channel at the 5th subframe is 4 Kb. In the 6th subframe, 3 Kb of data from the logical channel have been transmitted. Because 1 Kb worth of token is accumulated at the 7th subframe, the total accumulated token for the logical channel at the end of the 7th subframe is 2 Kb. Thus, even if the logical channel has not transmitted any data, it can make a lot of transmissions at a later time thanks to the accumulated token, but no more than the maximum token.

Dual Connectivity

One promising solution which is currently under discussion in 3GPP RAN working groups is the so-called "dual connectivity" concept. The term "dual connectivity" is used to refer to an operation where a given UE consumes radio resources provided by at least two different network nodes connected with non-ideal backhaul. Essentially UE is connected with both macro cell (macro eNB) and small cell (secondary eNB). Furthermore, each eNB involved in dual connectivity for a UE may assume different roles. Those roles do not necessarily depend on the eNB's power class and can vary among UEs.

Since the study Item is currently at a very early stage, details on the dual connectivity are not decided yet. For example the architecture has not been agreed on yet. Therefore many issues/details, e.g., protocol enhancements, are still open currently. FIG. 9 shows some exemplary architecture for dual connectivity. It should be only understood as one potential option. However the present disclosure is not limited to this specific network/protocol architecture but can be applied generally. Following assumptions on the architecture are made here:

Per bearer level decision where to serve each packet, C/U plane split
    As an example UE RRC signalling and high QoS data such as VoLTE can be served by the Macro cell, while best effort data is offloaded to the small cell.
No coupling between bearers, so no common PDCP or RLC required between the Macro cell and small cell
Looser coordination between RAN nodes
SeNB has no connection to S-GW, i.e., packets are forwarded by MeNB
Small Cell is transparent to CN.

Regarding the last two bullet points, it should be noted that it is also possible that SeNB is connected directly with the S-GW, i.e., S1-U is between S-GW and SeNB. Essentially there are three different options with respect to the bearer mapping/splitting:

option 1: S1-U also terminates in SeNB;
option 2: S1-U terminates in MeNB, no bearer split in RAN;
option 3: S1-U terminates in MeNB, bearer split in RAN.

FIG. 10 depicts those three options taking the downlink direction for the U-plane data as an example. Option 2 is assumed throughout the description and also shown in the figure.

A common problem of any wireless communication system is that resources are limited and it is not possible to allocate and use all the resources all the time since there is more than one potential seeker of these resources.

This requirement gets complicated since the allocation and use of the limited resources has to be done in view of what (resource) is minimally required to serve the agreed Quality of Service (QoS) of a bearer of each UE and also in view of that different UEs might be experiencing different radio channels and therefore would need different amount of resources to fulfil even the similar need. The decision of resource allocation is done for every Transmission Time Interval (TTI) which, for LTE, is 1 ms. Thus, every 1 ms, the network needs to decide how much DL resource it allocates towards each of the UEs for which there is some data to be sent to it. Similarly, every 1 ms, the network needs to decide how much UL resource it allocates towards each of the UEs which have information to transmit.

The Downlink (DL) is however different from the Uplink (UL). In DL, the eNB has the complete view of the requirements of all the UEs and their bearer(s). Namely, how much data is to be transmitted to each UE for each of their bearers, what is the radio condition (and therefore which resources are good/bad), QoS, etc. In UL however, the network does not know how much data the UE has send on each of its UL bearers. So, it cannot allocate a precise amount of resources for each of the UL bearer of this UE.

One possible solution could be to allocate "sufficient" amount of resources to the UE such that all the UL bearers will be satisfied at least 'statistically'. However, since the resources are limited, this would very often mean wasting such resources and then some other UEs/bearers will starve. For this reason the UE sends the Buffer Status Report (BSR) from time to time, when certain conditions as specified in chapter 5.4.5 in 3GPP TS 36.321-a40 are met, so that the network has some idea about UE's UL transmission requirements.

Another challenge is that the network has to ensure that a UE implementation does not completely use the provided grant arbitrarily which might make the QoS fulfilment of the bearer(s) difficult. For this purpose certain rules are defined on how the UE shall use the grant across its bearers. This is called Logical Channel Prioritization (LCP) since this is mainly about maintaining some priority between different Logical Channels, which realize the radio bearer(s). Both Buffer Status Reporting and Logical Channel Prioritization are the functions of the MAC sub-layer of LTE Protocol Stack.

In LTE Rel. 8/9, for example, there was only one MAC entity per UE that runs the LCP to allocate grant(s) across all bearer(s), i.e., inform the resulting grant to each of the RLC entity. Even when Carrier Aggregation was introduced in LTE and as a result there were grants received from more than one cell at a time, the single MAC entity was responsible for running LCP and allocated an applicable grant to each RLC entity. This is shown in the diagram of FIG. 11.

With the introduction of Small Cell Enhancements, in one of the possible architecture option, it is possible that physical resources are allocated by more than one Cell to a corresponding MAC entity. In other words, there can be as many MAC entities in the UE as the number of participating cell(s) in the UL. This is not a problem from LCP/BSR reporting point of view since these MAC schedulers can run their own LCP, or report the BSR, and inform the resulting grant to each of their corresponding RLC entities, such as illustrated in FIG. 12.

This is, for instance, the situation in architecture option 2, e.g., 2C which is shown in FIG. 13. In architecture option 2C, the air-interface transmission of a particular bearer is completely via a particular cell; in the diagram of FIG. 13, the left bearer transmission is via MeNB physical resources, and the right bearer transmission is via the SeNB physical resources. The corresponding UE side picture of the Protocol Stack is shown in FIG. 14.

A problem arises in architecture option 3, e.g., 3C which is shown in FIGS. 15 and 16. In particular, in option 3C, the MACs in Cell 1 and Cell 2 do not know how much grant they should allocate for the shared (dashed) bearer since there is no defined rule so far. Therefore, as per today, if these MAC Schedulers strictly run the LCP, then they may end up over-allocating a grant (for instance, each allocating grant to the radio bearer equals to 'prioritisedBitRate') to the dashed bearer which now would receive grants twice. On the other hand, it defeats the fundamental purpose of Small Cell Enhancements since the network may want to allocate maximum data to be transmitted via Cell 2 since this is the cell that is used for offloading gain.

Similarly, it is not clear how the Buffer Status will be reported for the data available for transmission corresponding to the dashed bearer. The buffer Status reporting procedure is used to provide the serving eNB with information about the amount of data available for transmission in the UL buffers of the UE. The amount of data available for transmission is the sum of data available for transmission in PDCP and data available for transmission in RLC entity (the details of which are publicly available in 3GPP documents TS 36.322 and 36.323). Further, since (as shown in FIG. 16) the PDCP is a common entity, the Individual RLC entities of the split-dashed-bearer (i.e., RLC of MeNB and RLC of SeNB) derive their SDUs from. Therefore, following the present specification the data available for transmission may double-count the same PDCP SDUs and PDCP PDUs not yet submitted to RLC, one for each MAC entity or cell.

Thus, a configuration in which the UE can communicate with at least two cells while avoiding at least some of the drawbacks illustrated above is preferred.

CITATION LIST

Non Patent Literature

NPL1 3GPP TS 36.211, "Evolved Universal Terrestrial Radio Access (E-UTRA); Physical Channels and Modulation (Release 8)," version 8.9.0, December 2009
NPL2 3GPP TS 36.321, "Evolved Universal Terrestrial Radio Access (E-UTRA); Medium Access Control (MAC); Protocol specification (Release 10)," version 10.4.0, December 2011
NPL3 3GPP TS 36.331, "Evolved Universal Terrestrial Radio Access (E-UTRA); Radio Resource Control (RRC); Protocol specification (Release 10)," version 10.10.0, March 2013
NPL4 3GPP TR 36.932, "Technical Specification Group Radio Access Network; Scenarios and Requirements for Small Cell Enhancements for E-UTRA and E-UTRAN (Release 12)," version 1.0.0, December 2012
NPL5 3GPP TS 36.842, "Evolved Universal Terrestrial Radio Access (E-UTRA); Study on Small Cell Enhancements for E-UTRA and E-UTRAN—Higher layer aspects (Release 12)," version 0.2.0, May 2013
NPL6 3GPP TS 36.322, "Technical Specification Group Radio Access Network; Evolved Universal Terrestrial Radio Access (E-UTRA); Radio Link Control (RLC) protocol specification (Release 10)," version 10.0.0, December 2010
NPL7 3GPP TS 36.323, "Technical Specification Group Radio Access Network; Evolved Universal Terrestrial Radio Access (E-UTRA); Packet Data Convergence Protocol (PDCP) specification (Release 11)," version 11.0.0, September 2012

BRIEF SUMMARY

The above-mentioned drawbacks are overcome by the teaching of the independent claims. Further additional advantages are achieved by the teaching of the dependent claims.

One non-limiting and exemplary embodiment of the present disclosure provides a communication method for a mobile node connectable to a master base station and to a secondary base station by using a split bearer split across the master base station and the secondary base station. A Packet Data Convergence Protocol, PDCP, layer located in the mobile node is shared for the split bearer between the master base station and the secondary base station. In this method the mobile node splits a total buffer occupancy of the PDCP layer in the mobile node between the master base station and the secondary base station based on a split ratio, into a first PDCP buffer occupancy value for the master base station and a second PDCP buffer occupancy value for the secondary base station. The mobile node generates a first buffer status report for the master base station based on the first PDCP buffer occupancy value, and further also generates a second buffer status report for the secondary base station based on the second PDCP buffer occupancy value. Subsequently, the mobile node transmits the first buffer status report to the master base station, and transmits the second buffer status report to the secondary base station.

According to an alternative and advantageous variant of the embodiment of the present disclosure which can be used in addition or alternatively to the above, a particular split ratio is defined such that one of the first and second PDCP buffer occupancy values is equal to the total buffer occupancy of the PDCP layer in the mobile node for the split bearer, and such that the other one of the first and second PDCP buffer occupancy values is equal to zero. Preferably, said particular split ratio is expressed by 1 to 0 or 0 to 1.

According to an alternative and advantageous variant of the embodiment of the present disclosure which can be used in addition or alternatively to the above, when being configured with the particular split ratio, the mobile node transmit all uplink data, processed by the PDCP layer, to either the master base station or the secondary base station depending on the particular split ratio, with the exception of RLC uplink data being transmitted to the respective base station.

According to an alternative and advantageous variant of the embodiment of the present disclosure which can be used in addition or alternatively to the above, when being configured with the particular split ratio, the mobile node deactivates the split bearer for uplink data, processed by the PDCP layer, to either the master base station or the secondary base station depending on the particular split ratio.

According to an alternative and advantageous variant of the embodiment of the present disclosure which can be used in addition or alternatively to the above, the mobile node is informed by the master base station about how to split the total buffer occupancy of the PDCP layer in the mobile node between the master base station and the secondary base station. Preferably this may be done by a flag in an information element associated with the split bearer.

According to an alternative and advantageous variant of the embodiment of the present disclosure which can be used in addition or alternatively to the above, a first Radio Link Control, RLC layer is located in the mobile node for the split bearer to the master base station, and a second RLC layer is located in the mobile node for the split bearer to the secondary base station. The first buffer status report is generated by the mobile node based on the sum of the first PDCP buffer occupancy value and a buffer occupancy value of the first RLC layer in the mobile node. The second buffer status report is generated by the mobile node based on the sum of the second PDCP buffer occupancy value and a buffer occupancy value of the second RLC layer in the mobile node.

According to an alternative and advantageous variant of the embodiment of the present disclosure which can be used in addition or alternatively to the above, a particular split ratio is defined such that one of the first and second PDCP buffer occupancy values is equal to the total buffer occupancy of the PDCP layer in the mobile node for the split bearer, and such that the other one of the first and second PDCP buffer occupancy values is equal to zero. Furthermore, in case the first respectively second buffer status report is zero, the first respectively second buffer status report is not transmitted.

According to an alternative and advantageous variant of the embodiment of the present disclosure which can be used in addition or alternatively to the above, the mobile node is configured to transmit all the acknowledgements of the Transmission Control Protocol, TCP, layer, relating to TCP downlink data received in the mobile node, to the master base station. This is preferably done independent from whether or not the remaining uplink data is transmitted by the mobile node to the master base station.

According to an alternative and advantageous variant of the embodiment of the present disclosure which can be used in addition or alternatively to the above, the PDCP layer of the mobile node detects TCP acknowledgments and internally forwards the detected TCP acknowledgements to lower layers to be transmitted via a channel to the master base station.

According to an alternative and advantageous variant of the embodiment of the present disclosure which can be used in addition or alternatively to the above, the calculation of the first buffer status report considers the transmission of all the acknowledgements of the TCP layer to the master base station, irrespective of the split ratio.

According to an alternative and advantageous variant of the embodiment of the present disclosure which can be used in addition or alternatively to the above, the mobile node performs a first Logical Channel Prioritization, LCP, procedure for the split bearer to the master base station, based on the value of the buffer occupancy for the split bearer to the master base station reported with the first buffer status report. Similarly, the mobile node performs a second Logical Channel Prioritization, LCP, procedure for the split bearer to the secondary base station, based on the value of the buffer occupancy for the split bearer to the secondary base station reported with the second buffer status report.

According to an alternative and advantageous variant of the embodiment of the present disclosure which can be used in addition or alternatively to the above, the value of the buffer occupancy reported with the first buffer status report is considered in the first LCP procedure by serving resources to the split bearer to the master base station as a maximum up to the value of the buffer occupancy reported with the first buffer status report for the split bearer to the master base station. The value of the buffer occupancy reported with the second buffer status report is considered in the second LCP procedure by serving resources to the split bearer to the secondary base station as a maximum up to the value of the buffer occupancy reported with the second buffer status report for the split bearer to the secondary base station.

According to an alternative and advantageous variant of the embodiment of the present disclosure which can be used in addition or alternatively to the above, a first Media Access Control, MAC, layer is located in the mobile node for the split bearer to the master base station, and a second MAC layer is located in the mobile node for the split bearer to the secondary base station. When buffer status reporting is triggered in the first MAC layer due to data arrival in the buffer of the split bearer, the first MAC layer triggers the buffer status reporting in the second MAC layer for the split bearer. When buffer status reporting is triggered in the second MAC layer due to data arrival in the buffer of the split bearer, the second MAC layer triggers the buffer status reporting in the first MAC layer for the split bearer.

According to an alternative and advantageous variant of the embodiment of the present disclosure which can be used in addition or alternatively to the above, the first buffer status report is generated by the first MAC layer at the time of being triggered, and the second buffer status report is generated by the second MAC layer at the time of being triggered. Alternatively, in case the first buffer status report is scheduled to be transmitted before second buffer status report, the first buffer status report is generated by the first MAC layer at the time the first buffer status report is scheduled to be transmitted to the master base station, and the second buffer status report is generated by the second MAC layer at the time the first buffer status report is scheduled to be transmitted to the master base station. Still alternatively to the above, the first buffer status report is generated by the first MAC layer at the time the first buffer status report is scheduled to be transmitted to the master base station, and the second buffer status report is generated by the second MAC layer at the time the second buffer status report is scheduled to be transmitted to the secondary base station. Still further alternatively to the above, the first buffer status report is generated by the first MAC layer at the time the first buffer status report is scheduled to be transmitted to the master base station or at the time the first buffer status report is triggered at the first MAC layer, and the second buffer status report is generated by the second MAC layer at the time the second buffer status report is scheduled to be transmitted to the secondary base station, wherein the second buffer status report includes the value of the data not reported by the first buffer status report.

According to an alternative and advantageous variant of the embodiment of the present disclosure which can be used in addition or alternatively to the above, a first Media Access Control, MAC, layer is located in the mobile node for the split bearer to the master base station, and a second MAC layer is located in the mobile node for the split bearer to the secondary base station. Buffer status reporting is triggered in the first MAC layer due to data arrival in the buffer of the split bearer. Buffer status reporting is triggered in the second MAC layer due to data arrival in the buffer of the split bearer.

The embodiment further provides a mobile node connectable to a master base station and to a secondary base station by using a split bearer split across the master base station and the secondary base station. A Packet Data Convergence Protocol, PDCP, layer located in the mobile node is shared for the split bearer between the master base station and the secondary base station. A processor of the mobile node splits a total buffer occupancy of the PDCP layer in the mobile node between the master base station and the secondary base station, based on a split ratio, into a first PDCP buffer occupancy value for the master base station and a second PDCP buffer occupancy value for the secondary base station. The processor generates a first buffer status report for the master base station based on the first PDCP buffer occupancy value, and generates a second buffer status report for the secondary base station based on the second PDCP buffer occupancy value. A transmitter of the mobile node transmits the first buffer status report to the master base station, and transmitting the second buffer status report to the secondary base station.

An embodiment of the present disclosure provides a communication method for a mobile node connectable to a master base station and to a secondary base station by using a logical channel shared by the master base station and the secondary base station. A Packet Data Convergence Protocol, PDCP, layer is located in the mobile node and shared for the shared logical channel between the master base station and the secondary base station. The mobile node splits a total buffer occupancy of the PDCP layer in the mobile node between the master base station and the secondary base station based on a split-buffer ratio, into a first PDCP buffer occupancy value for the master base station and a second PDCP buffer occupancy value for the secondary base station. The mobile node generates a first buffer status report for the master base station based on the first PDCP buffer occupancy value, and generates a second buffer status report for the secondary base station based on the second PDCP buffer occupancy value. The mobile node transmits the first buffer status report to the master base station, and transmits the second buffer status report to the secondary base station.

According to an advantageous variant of the embodiment of the present disclosure which can be used in addition or alternatively to the above, the split-buffer ratio is determined by the master base station, preferably based on at least one of: a load handled by the Secondary Base Station, offload requirements, channel conditions, quality of service. The determined split-buffer ratio is transmitted from the master base station to the mobile node and/or the secondary base station, preferably using Radio Resource Control, RRC, signalling, or Media Access Control, MAC, signalling.

According to an advantageous variant of the embodiment of the present disclosure which can be used in addition or alternatively to the above, the split-buffer ratio is determined by the mobile node, preferably based on at least one of: radio thresholds of the radio links between the mobile node and respectively the master and secondary base station, past resource grants received by the mobile node. The determined split-buffer ratio is transmitted from the mobile node to the master base station and/or the secondary base station, preferably using Radio Resource Control, RRC, signalling, or Media Access Control, MAC, signalling.

According to an advantageous variant of the embodiment of the present disclosure which can be used in addition or alternatively to the above, a first Radio Link Control, RLC layer is located in the mobile node for the shared logical channel to the master base station, and a second RLC layer is located in the mobile node for the shared logical channel to the secondary base station. The first buffer status report is generated by the mobile node based on the sum of the first PDCP buffer occupancy value and a buffer occupancy value of the first RLC layer in the mobile node. The second buffer status report is generated by the mobile node based on the sum of the second PDCP buffer occupancy value and a buffer occupancy value of the second RLC layer in the mobile node.

According to an advantageous variant of the embodiment of the present disclosure which can be used in addition or alternatively to the above, the mobile node is connectable to the master base station and to the secondary base station by using a plurality of logical channels shared between the master base station and the secondary base station. The split-buffer ratio is applied to only one or a set of logical channels out of the plurality of shared logical channels, or the split-buffer ratio is applied to all of the plurality of shared logical channels.

According to an advantageous variant of the embodiment of the present disclosure which can be used in addition or alternatively to the above, determining whether the total buffer occupancy of the PDCP layer and the RLC layer in the mobile node exceeds a pre-determined threshold or not. If yes, the steps of splitting the total buffer occupancy, generating and transmitting the first and second buffer status reports are performed. If no, the steps of splitting the total buffer occupancy, generating and transmitting the first and second buffer status reports are not performed, and the mobile node generates and transmits its uplink data buffer status report to only one of the master or secondary base station.

According to an advantageous variant of the embodiment of the present disclosure which can be used in addition or alternatively to the above, the mobile node transmits the first buffer status report for the master base station to the secondary base station, preferably for the secondary base station to estimate the amount of resources the mobile station might be allocated in the next few subframes from the master base station. The mobile node transmits the second buffer status report for the secondary base station to the master base station, preferably for the master base station to estimate the amount of resources the mobile station might be allocated in the next few subframes from the secondary base station.

An embodiment of the present disclosure provides further a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. A processor of the mobile node splits a total buffer occupancy of the PDCP layer in the mobile node between the master base station and the secondary base station, based on a split-bearer buffer ratio, into a first PDCP buffer occupancy value for the master base station and a second PDCP buffer occupancy value for the secondary base station. A processor of the mobile node generates a first buffer status report for the master base station based on the first PDCP buffer occupancy value, and generates a second buffer status report for the secondary base station based on the second PDCP buffer occupancy value. A transmitter of the mobile node transmits the first buffer status report to the master base station, and transmits the second buffer status report to the secondary base station.

According to an advantageous variant of the embodiment of the present disclosure which can be used in addition or alternatively to the above, a receiver of the mobile node receives from the master base station the split-buffer ratio, determined by the master base station, preferably using Radio Resource Control, RRC, signalling, or Media Access Control, MAC, signalling.

According to an advantageous variant of the embodiment of the present disclosure which can be used in addition or alternatively to the above, the split-buffer ratio is determined by the mobile node, preferably based on at least one of: radio thresholds of the radio links between the mobile node and respectively the master and secondary base station, past resource grants received by the mobile node. The transmitter transmits the determined split-buffer ratio to the master base station and/or the secondary base station, preferably using Radio Resource Control, RRC, signalling, or Media Access Control, MAC, signalling.

According to an advantageous variant of the embodiment of the present disclosure which can be used in addition or alternatively to the above, a first Radio Link Control, RLC layer is located in the mobile node for the shared logical channel to the master base station, and a second RLC layer is located in the mobile node for the shared logical channel to the secondary base station. The processor generates the first buffer status report based on the sum of the first PDCP buffer occupancy value and a buffer occupancy value of the first RLC layer in the mobile node. The processor generates the second buffer status report based on the sum of the second PDCP buffer occupancy value and a buffer occupancy value of the second RLC layer in the mobile node.

According to an advantageous variant of the embodiment of the present disclosure which can be used in addition or alternatively to the above, the processor determines whether the total buffer occupancy of the PDCP layer and the RLC layer in the mobile node exceeds a pre-determined threshold or not. If yes, the steps of splitting the total buffer occupancy, generating and transmitting the first and second buffer status reports are performed. If no, the steps of splitting the total buffer occupancy, generating and transmitting the first and second buffer status reports are not performed, and the mobile node generates and transmits its uplink data buffer status report to only one of the master or secondary base station.

An embodiment of the present disclosure provides further a master base station for use in a mobile communication system, where a mobile node is connected to the master base station and to a secondary base station by using a logical channel shared by the master base station and the secondary base station. A Packet Data Convergence Protocol, PDCP, layer located in the mobile node is shared for the shared logical channel between the master base station and the secondary base station. A processor of the master base station determines a split-buffer ratio, preferably based on at least one of: a load handled by the Secondary Base Station, offload requirements, channel conditions, quality of service. The split-buffer ratio is for use by the mobile node to split a total buffer occupancy of the PDCP layer in the mobile node between the master base station and the secondary base station based on the split-buffer ratio, into a first PDCP buffer occupancy value for the master base station and a second PDCP buffer occupancy value for the secondary base station. A transmitter transmits the determined split-buffer ratio to the mobile node and/or the secondary base station, preferably using Radio Resource Control, RRC, signalling, or Media Access Control, MAC, signalling.

A further embodiment of the present disclosure provides a method for a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. A first Radio Link Control, RLC layer is located in the mobile node for the shared logical channel to the master base station, and a second RLC layer is located in the mobile node for the shared logical channel to the secondary base station. The mobile node transmits a total buffer occupancy value of the PDCP layer in the mobile node, a buffer occupancy value of the first RLC layer and a buffer occupancy value of the second RLC layer, to the master base station and/or the secondary base station. Either the master base station or the secondary base station determine a split ratio, based on the received total buffer occupancy value of the PDCP layer in the mobile node, the buffer occupancy value of the first RLC layer and the buffer occupancy value of the second RLC layer. The determined split ratio is transmitted to the other one of the master base station and the secondary base station. The master base station and secondary base station, perform the uplink resource allocation for the shared logical channel, respectively based on the split ratio, such that the uplink resource allocation for the shared logical channel for the data as indicated by the received total occupancy value of the PDCP layer is split between the master base station and the secondary base station according to the split ratio.

According to an advantageous variant of the embodiment of the present disclosure which can be used in addition or alternatively to the above, the master base station configures the shared logical channel to be alone within a logical channel group.

According to an advantageous variant of the embodiment of the present disclosure which can be used in addition or alternatively to the above, the mobile node determines to which base station to transmit the total buffer occupancy value of the PDCP layer in the mobile node, the buffer occupancy value of the first RLC layer and the buffer occupancy value of the second RLC layer, preferably based on at least one of:
  past resource allocations received from the secondary base station and master base station,
  radio link thresholds,
  the amount of buffer occupancy,
  whether or not previous resource allocations from the secondary base station or master base station were enough for the mobile node to transmit all data.

According to an advantageous variant of the embodiment of the present disclosure which can be used in addition or alternatively to the above, the mobile node determines to which base station to transmit the total buffer occupancy value of the PDCP layer in the mobile node, the buffer occupancy value of the first RLC layer and the buffer occupancy value of the second RLC layer.

The further embodiment of the present disclosure provides a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. A first Radio Link Control, RLC layer is located in the mobile node for the shared logical channel to the master base station, and a second RLC layer is located in the mobile node for the shared logical channel to the secondary base station. A transmitter of the mobile node transmits a total buffer occupancy value of the PDCP layer in the mobile node, a buffer occupancy value of the first RLC layer and a buffer occupancy value of the second RLC layer, to the master base station and the secondary base station, for the master or secondary base station to determine a split ratio, based on which the uplink resource allocation for the shared logical channel is respectively performed by the master and secondary base station, such that the uplink resource allocation for the shared logical channel for the data as indicated by the received total occupancy value of the PDCP layer is split between the master base station and the secondary base station according to the split ratio.

The further embodiment of the present disclosure provides a master base station for use in a mobile communication system, wherein a mobile node is connectable to the master base station and to a secondary base station by using a logical channel shared by the master base station and the secondary base station. A Packet Data Convergence Protocol, PDCP, layer located in the mobile node is shared for the shared logical channel between the master base station and the secondary base station. A first Radio Link Control, RLC layer is located in the mobile node for the shared logical channel to the master base station, and a second RLC layer is located in the mobile node for the shared logical channel to the secondary base station. A receiver of the master base station receives from the mobile node a total buffer occupancy value of the PDCP layer in the mobile node, a buffer occupancy value of the first RLC layer and a buffer occupancy value of the second RLC layer. A processor of the master base station determines a split ratio, based on the received total buffer occupancy value of the PDCP layer in the mobile node, the buffer occupancy value of the first RLC layer and the buffer occupancy value of the second RLC layer. A transmitter of the master base station transmits the determined split ratio to the secondary base station. The processor performs the uplink resource allocation for the shared logical channel, based on the split ratio, such that the uplink resource allocation for the shared logical channel for the data as indicated by the received total occupancy value of the PDCP layer is split between the master base station and the secondary base station according to the split ratio.

A still further embodiment of the present disclosure provides a communication method for a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. A prioritized bitrate parameter used for a logical channel prioritization, LCP, procedure, is split into a first prioritized bitrate parameter for the LCP, procedure for the shared logical channel to the master base station, and into a second prioritized bitrate parameter for the LCP procedure for the shared logical to the secondary base station, The mobile node performs a first LCP procedure for the shared logical channel to the master base station, based on the first prioritized bitrate parameter. The mobile node performs a second LCP procedure for the shared logical channel to the secondary base station, based on the second prioritized bitrate parameter.

According to an advantageous variant of the embodiment of the present disclosure which can be used in addition or alternatively to the above, the first LCP procedure is performed by a Media Access Control, MAC, entity in the mobile node responsible for the master base station, and the LCP procedure is performed by a MAC entity in the mobile node responsible for the secondary base station.

The still further embodiment of the present disclosure provides a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. A processor of the mobile node splits a prioritized bitrate parameter used for a logical channel prioritization, LCP, procedure, into a first prioritized bitrate parameter for the LCP, procedure for the shared logical channel to the master base station, and into a second prioritized bitrate parameter for the LCP procedure for the shared logical to the secondary base station. The processor performs a first LCP procedure for the shared logical channel to the master base station, based on the first prioritized bitrate parameter, and performs a second LCP procedure for the shared logical channel to the secondary base station, based on the second prioritized bitrate parameter.

Another embodiment of the present disclosure provides a communication method for a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. The mobile node performs a first logical channel prioritization, LCP, procedure, for the shared logical channel to either the master base station or to the secondary base station, based on a prioritized bitrate parameter, including updating the prioritized bitrate parameter by the mobile node based on the first LCP procedure. After finishing the first LCP procedure by the mobile node, the mobile node performs a second LCP procedure of the shared logical channel to the other base station, secondary base station or master base station, based on the updated prioritized bitrate parameter.

According to an advantageous variant of the embodiment of the present disclosure which can be used in addition or alternatively to the above, the mobile node determines whether the first LCP procedure for the shared logical channel is either to the master base station or to the secondary base station, according to one of the following:

the first LCP procedure is always for the shared logical channel to the secondary base station, whereas the second LCP procedure is always for the shared logical channel to the master base station, the first LCP procedure is always for the shared logical channel to the master base station, whereas the second LCP procedure is always for the shared logical channel to the secondary base station, is determined on a random basis, based on previous uplink resource allocations received from the master base station and the secondary base stations, based on the amount of unsatisfied prioritized bitrate for the LCP procedure for the shared logical channel to the master base station, and/or based on the amount of unsatisfied prioritized bitrate for the LCP procedure for the shared logical channel to the secondary base station, According to an advantageous variant of the embodiment of the present disclosure which can be used in addition or alternatively to the above, the steps of performing the first and second LCP procedures are performed by the mobile node every transmission time interval.

This another embodiment further provides a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. A processor of the mobile node performs a first logical channel prioritization, LCP, procedure, for the shared logical channel to either the master base station or to the secondary base station, based on a prioritized bitrate parameter, including updating the prioritized bitrate parameter by the mobile node based on the first LCP procedure. The processor performs, after finishing the first LCP procedure, a second LCP procedure of the shared logical channel to the other base station, secondary base station or master base station, based on the updated prioritized bitrate parameter.

According to an advantageous variant of the embodiment of the present disclosure which can be used in addition or alternatively to the above, the steps of performing the first and second LCP procedures are performed by the processor of the mobile node every transmission time interval.

A still another embodiment of the present disclosure provides a communication method for a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. A first Media Access Control, MAC, entity in the mobile node is responsible to perform logical channel prioritization, LCP, procedures regarding the master base station. A second MAC entity in the mobile node is responsible to perform LCP procedure regarding the secondary base station. One of the first or second MAC entity in the mobile node performs a first LCP procedure for the shared logical channel, during a particular first number of transmission time intervals. After performing the first LCP procedure during the particular first number of transmission time intervals, the other one of the first or second MAC entity in the mobile node performs a second LCP procedure for the shared logical channel, during a particular second number of transmission time intervals.

According to an advantageous variant of the embodiment of the present disclosure which can be used in addition or alternatively to the above, the other one of the first or second MAC entity performs a third LCP procedure for other logical channels than the shared logical channel, during the first number of transmission time intervals. The one of the first or second MAC entity performs a fourth LCP procedure for other logical channels than the shared logical channel, during the second number of transmission time intervals.

This embodiment further provides a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. A first Media Access Control, MAC, entity in the mobile node is responsible to perform logical channel prioritization, LCP, procedures regarding the master base station. A second MAC entity in the mobile node is responsible to perform LCP procedure regarding the secondary base station. A processor of the mobile node performs via the one of the first or second MAC entity in the mobile node a first LCP procedure for the shared logical channel, during a particular first number of transmission time intervals. The processor performs, after performing the first LCP procedure during the particular first number of transmission time intervals, via the other one of the first or second MAC entity, a second LCP procedure for the shared logical channel, during a particular second number of transmission time intervals.

According to an advantageous variant of the embodiment of the present disclosure which can be used in addition or alternatively to the above, the processor performs via the other one of the first or second MAC entity a third LCP procedure for other logical channels than the shared logical channel, during the first number of transmission time intervals. The processor performs via one of the first or second MAC entity a fourth LCP procedure for other logical channels than the shared logical channel, during the second number of transmission time intervals.

A further embodiment of the present disclosure provides a communication method for a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. The master base station determines a first resource allocation for the mobile node with respect to the plurality of logical channels of the master base station, including the shared logical channel, and transmitting same to the mobile node. The secondary base station determines a second resource allocation for the mobile node with respect to the plurality of logical channels of the secondary base station, including the shared logical channel, and transmitting same to the mobile node. The mobile node determines the amount of unsatisfied prioritized bitrate or of remaining buffer for each of the plurality of logical channels, except for the shared logical channel, based on the first and second resource allocations. The mobile node re-allocates resources from either the received first or the received second resource allocation regarding to the shared logical channel, to the logical channels having an unsatisfied prioritized bitrate or remaining buffer in a logical channel order where the logical channel with the highest unsatisfied prioritized bitrate is first.

The further embodiment also provides a mobile node connectable to a master base station and to a secondary base station by using a logical channel shared by the master base station and the secondary base station. A Packet Data Convergence Protocol, PDCP, layer located in the mobile node is shared for the shared logical channel between the master base station and the secondary base station. A receiver of the mobile node receives from the master base station a first resource allocation for the mobile node with respect to the plurality of logical channels of the master base station, including the shared logical channel. The receiver receives from the secondary base station a second resource allocation for the mobile node with respect to the plurality of logical channels of the secondary base station, including the shared logical channel. A processor of the mobile node determines the amount of unsatisfied prioritized bitrate or of remaining buffer for each of the plurality of logical channels, except for the shared logical channel, based on the first and second resource allocations. The processor re-allocates resources from either the received first or the received second resource allocation regarding to the shared logical channel, to the logical channels having an unsatisfied prioritized bitrate or remaining buffer, in a logical channel order where the logical channel with the highest unsatisfied prioritized bitrate is first.

These general and specific aspects may be implemented using a system, a method, and a computer program, and any combination of systems, methods, and computer programs. Additional benefits and advantages of the disclosed embodiments will be apparent from the specification and figures. The benefits and/or advantages may be individually provided by the various embodiments and features of the specification and figures, and need not all be provided in order to obtain one or more of the same.

BRIEF DESCRIPTION OF THE SEVERAL VIEWS OF THE DRAWINGS

The present disclosure will be better understood with reference to the accompanying drawings. The corresponding embodiments are only possible configuration in which the individual features may, however, as described above, be implemented independently of each other or may be omitted. Equal elements illustrated in the drawings are provided with equal reference signs. Parts of the description relating to equal elements illustrated in the drawings may be left out.

DETAILED DESCRIPTION

In the present description, use is made of the following terms.

A "mobile station" or "mobile node" is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over it may communicate with other functional entities or correspondent nodes.

The term "master base station" used in the claims and throughout the description of the present disclosure is to be construed as used in the field of dual connectivity of 3GPP LTE-A; thus, other terms are macro base station, or master/macro eNB; or serving base station or any other terminology to be decided later by 3GPP. Similarly, the term "secondary base station" used in the claims and throughout the description is to be construed as used in the field of dual connectivity of 3GPP LTE-A; thus, other terms are slave base station, or secondary/slave eNB or any other terminology to be decided later by 3GPP.

Figure 1:
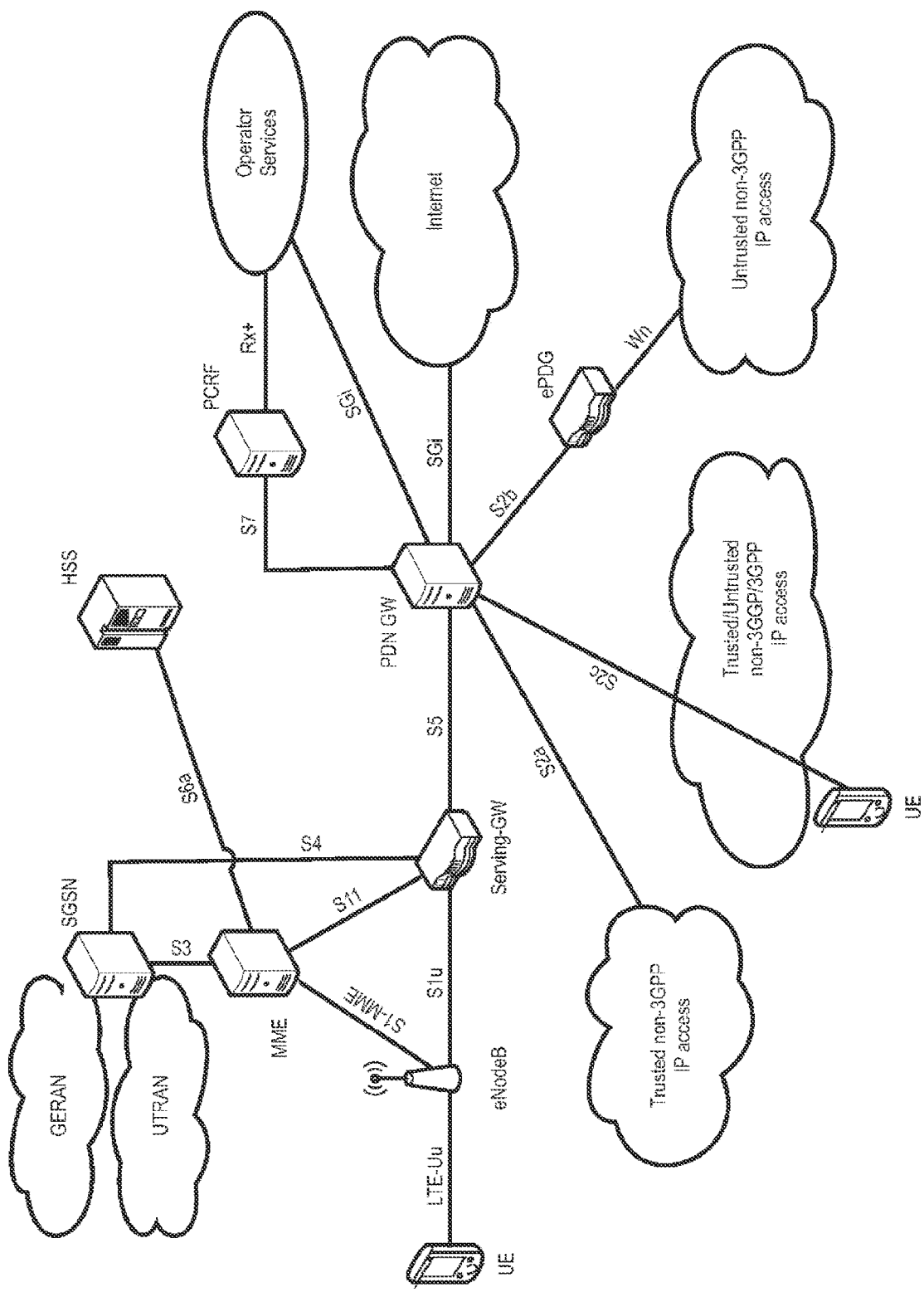
FIG. 1 schematically shows an exemplary architecture of a 3GPP LTE system.
Figure 2:
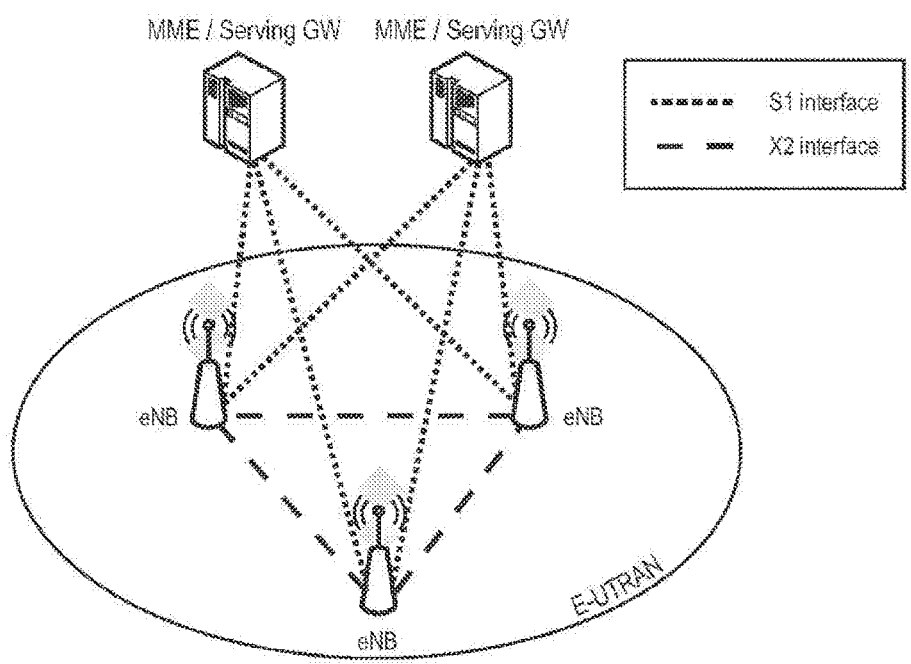
FIG. 2 schematically shows an exemplary overview of the overall E-UTRAN architecture of 3GPP LTE, FIG. 3 schematically shows exemplary subframe boundaries on a downlink component carrier as defined for 3GPP LTE (Release 8/9), FIG. 4 schematically illustrates the OSI model with the different layers for communication, FIG. 5 schematically illustrates the relationship of a protocol data unit (PDU) and a service data unit (SDU) as well as the inter-layer exchange of same, FIG. 6 schematically illustrates the layer 2 user and control-plane protocol stack composed of the three sublayers, PDCP, RLC and MAC, FIG. 7 schematically gives an overview of the different functions in the PDCP, RLC and MAC layers as well as illustrates exemplary the processing of SDUs/PDUs by the various layers, FIGS. 8A-8D schematically show four possible dual cell scenarios, FIG. 9 schematically shows exemplary architectures for dual connectivity, FIG. 10 schematically shows various options in the DL direction for the U-plane data.
Figure 3:
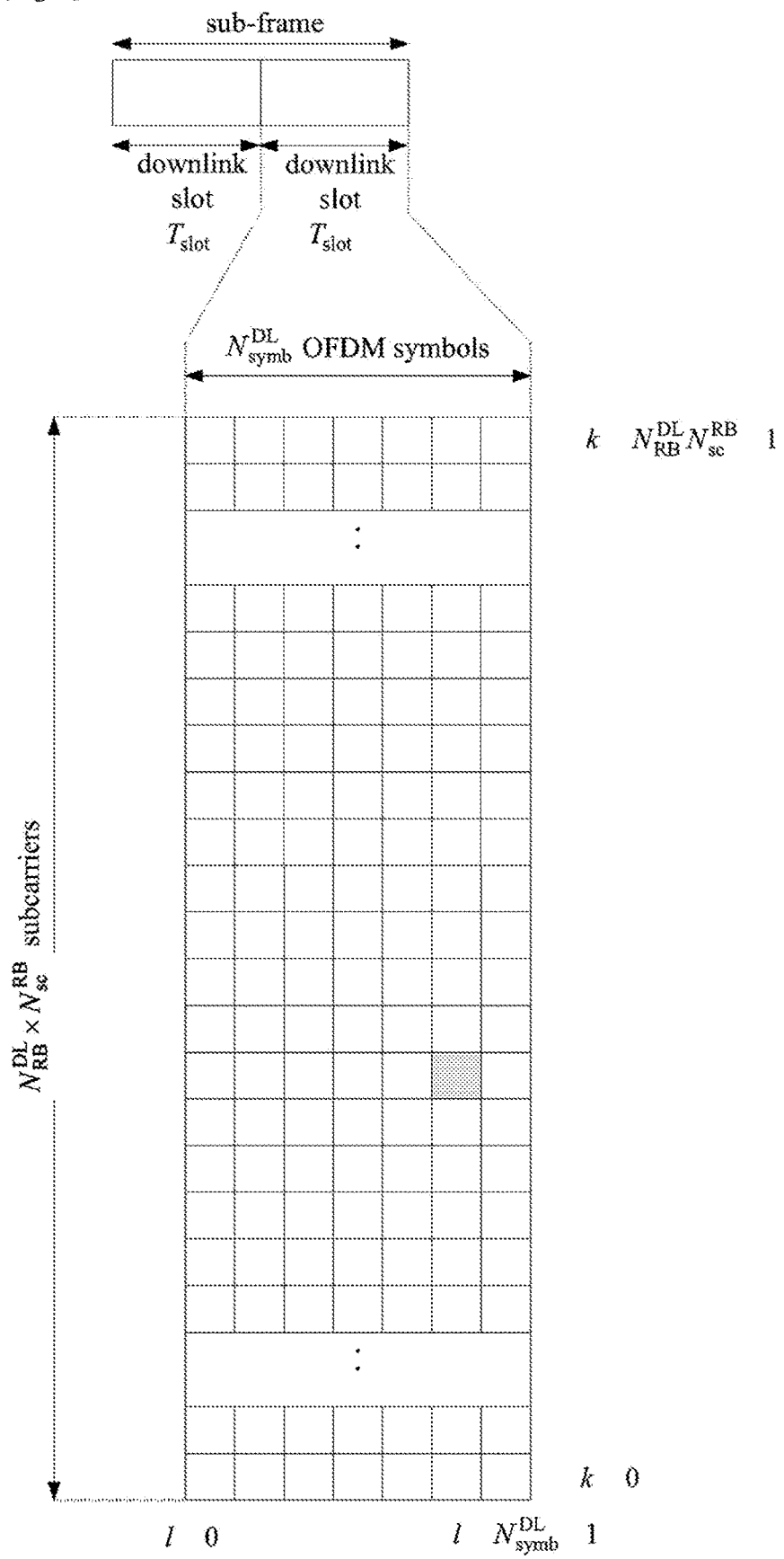
Figure 4:
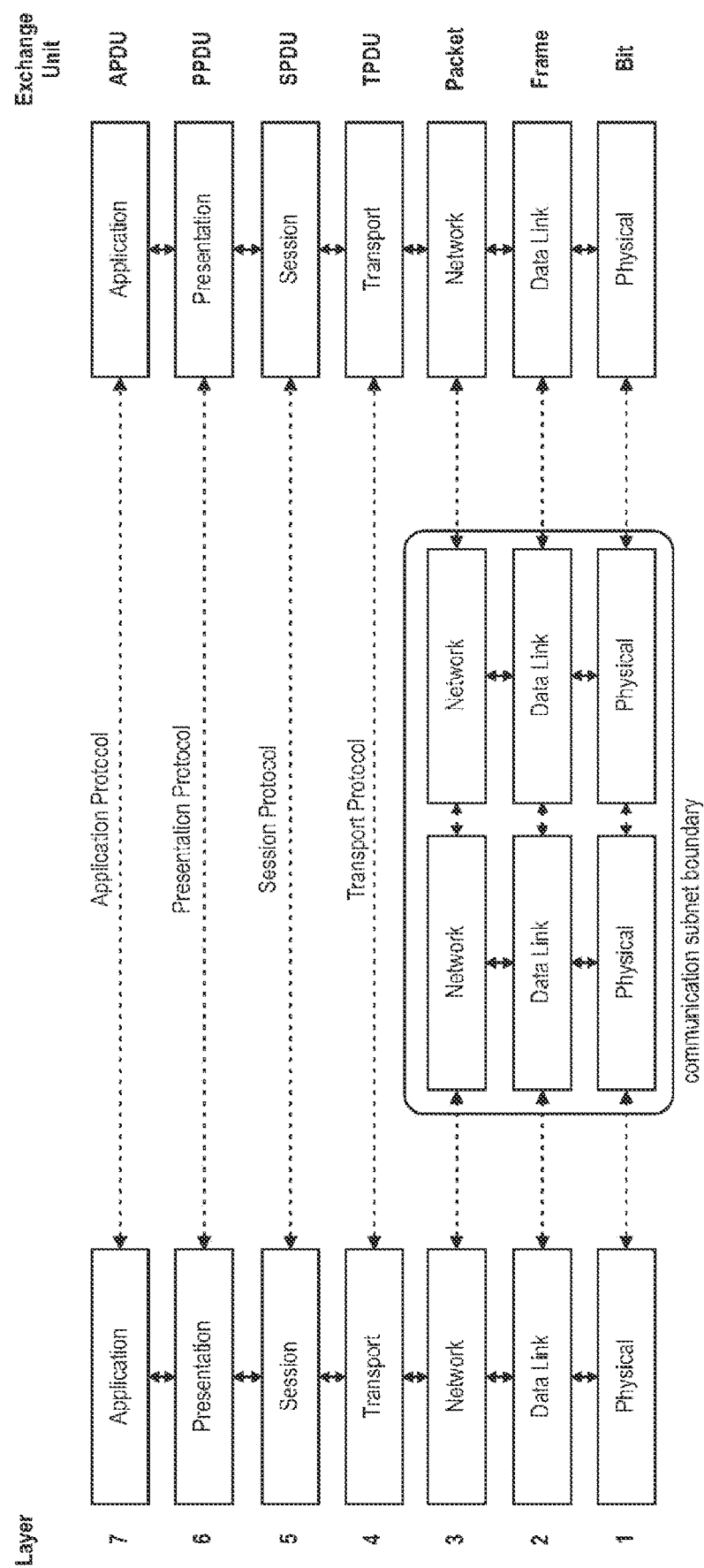
Figure 5:
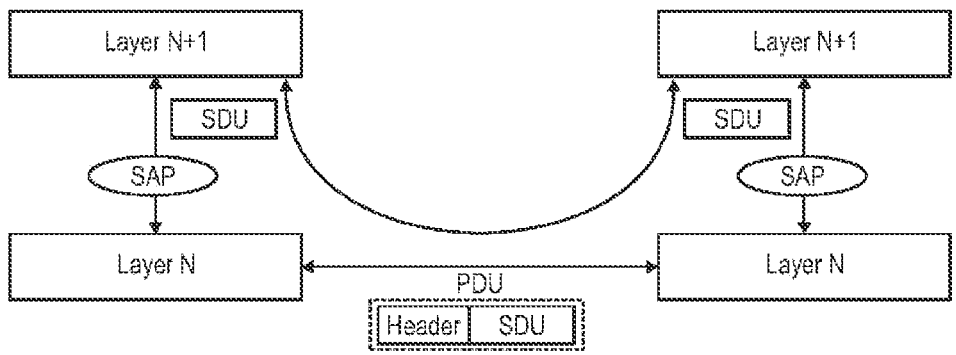
Figure 6:
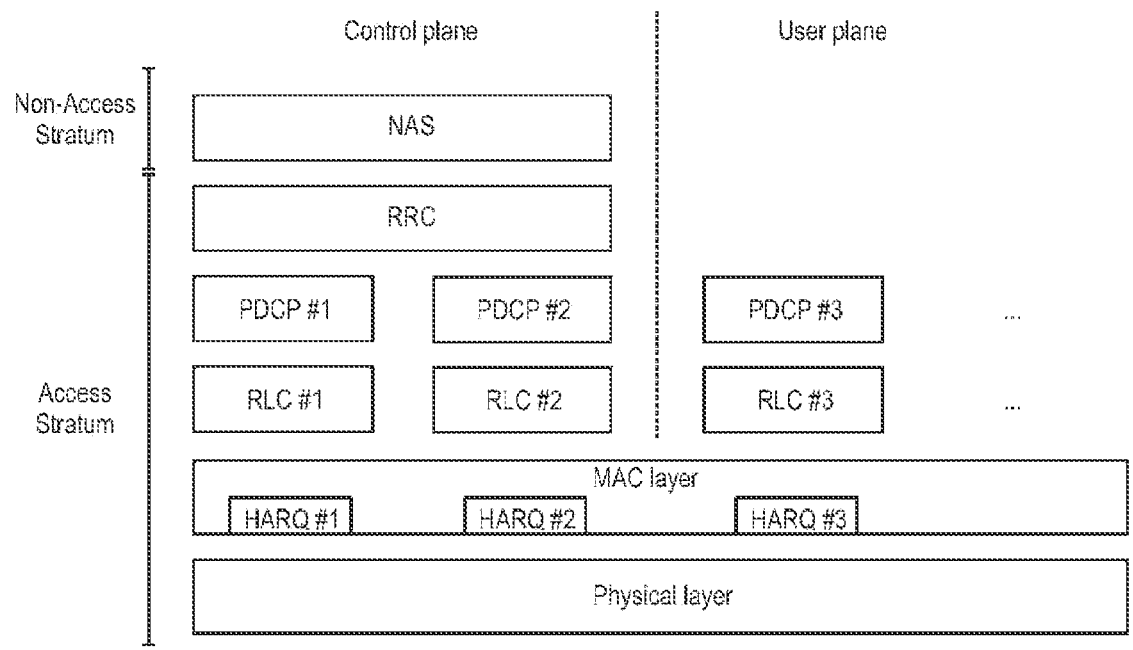
Figure 9:
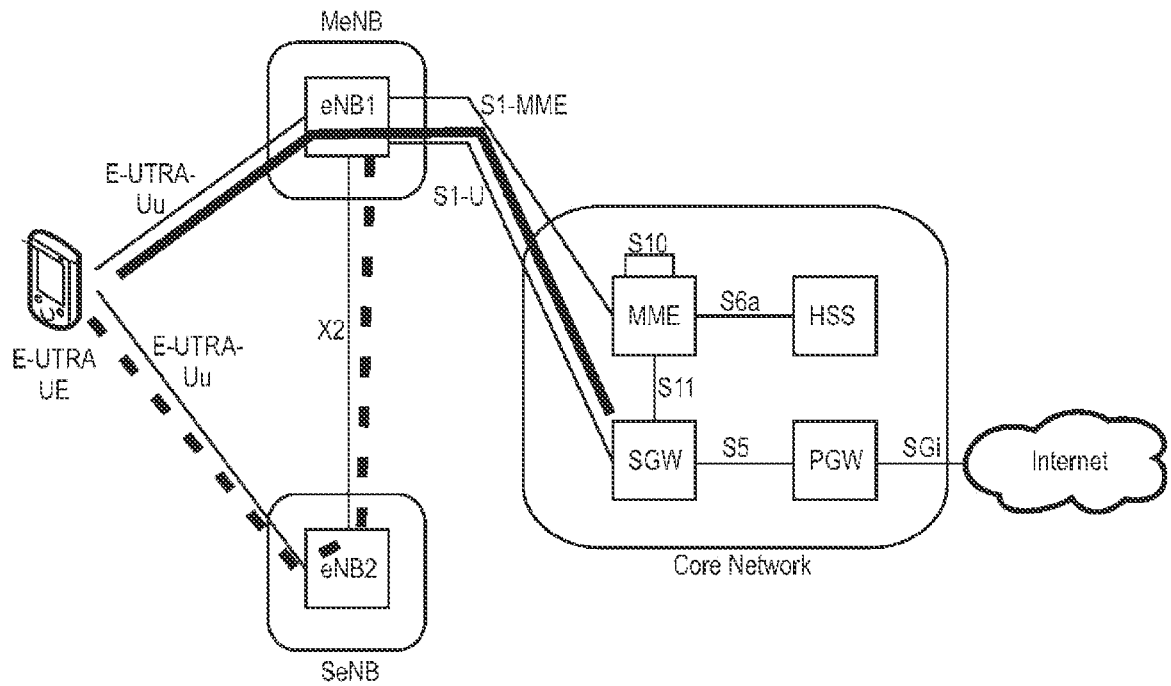
Figure 10:
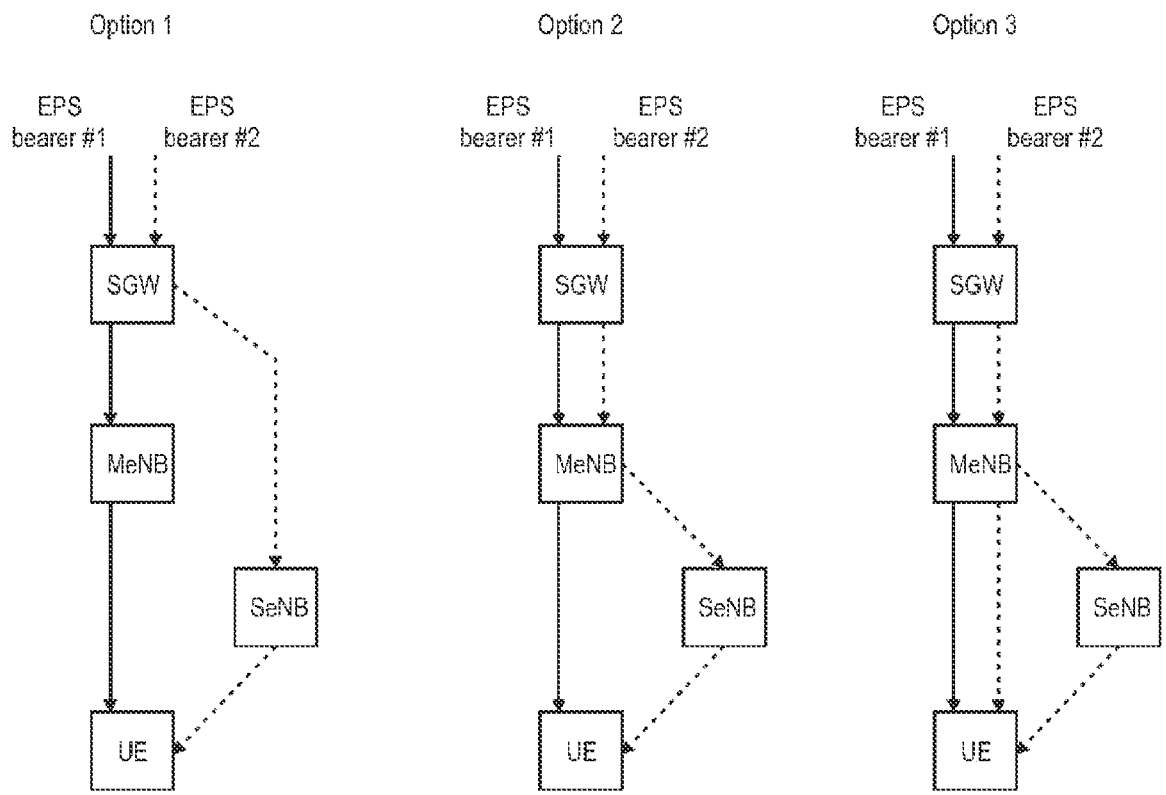
Figure 11:
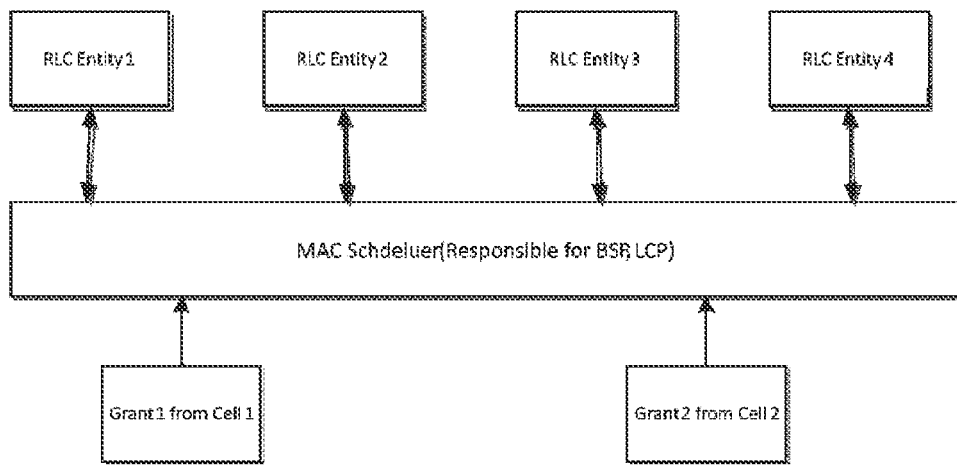
FIG. 11 schematically shows a single MAC entity receiving grants from more than one cell, FIG. 12 schematically shows two MAC cells receiving grants from two cells without split-bearers, FIG. 13 schematically shows a network side, user plane architecture option 2C, FIG. 14 schematically shows a UE side, user plane architecture option 2C, FIG. 15 schematically shows a network side, user plane architecture option 3C, FIG. 16 schematically shows a UE side, user plane architecture option 3C, FIG. 17 schematically shows In UP architecture option 3C and 3D, where the PDCP is a common entity, FIG. 18 schematically shows an example of an application of a ratio for deriving the BSR, FIG. 19 schematically shows a UE side user plane architecture option 3C according to one embodiment of the present disclosure, FIG. 20 schematically shows a UE side user plane architecture option 3C according to one embodiment of the present disclosure.
Figure 12:
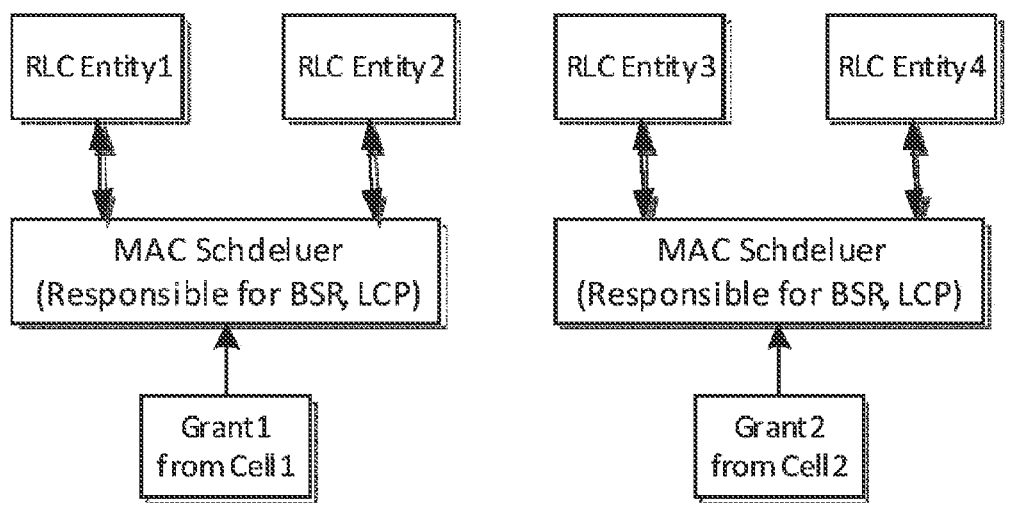
Figure 13:
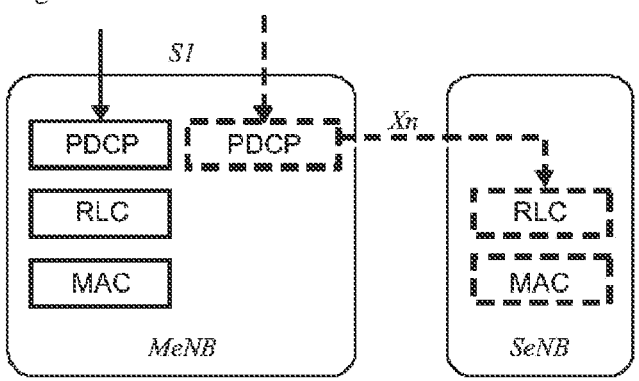
Figure 14:
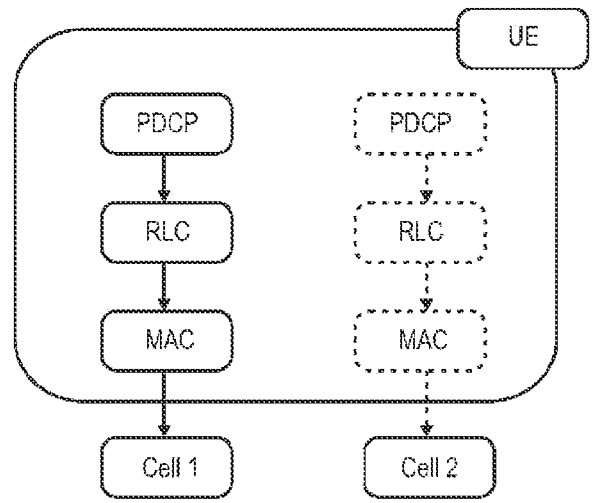

The term "radio bearer" used in the claims and throughout the description of the present disclosure is to be construed in connection with 3GPP terminology, and refers to a virtual connection between two endpoints, i.e., mobile station and base station, which is used for transport of data between those; a term that emphasizes the fact that the virtual connection provides a "bearer service", i.e., a transport service with specific QoS attributes. A data radio bearer may also be called user plane radio bearer, and a signaling radio bearer may also be called control plane radio bearer. A radio bearer shall be distinguished from other terminology as defined by 3GPP, such as S1 bearer, E-RAB, S5/S8 bearer, EPS bearer, etc. (see also FIG. 2.8 of LTE—The UMTS Long Term Evolution FROM THEORY TO PRACTICE, Edited by: Stefania Sesia, Issam Toufik, Matther Baker, Second Edition, ISBN 978-0-470-66025-6, incorporated herein by reference).

In the following, several embodiments of the present disclosure will be explained in detail. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the present disclosure may be advantageously used for example in a mobile communication system such as 3GPP LTE-A (Release 12) communication systems as described in the Technical Background section above. These embodiments are described as implementations for use in connection with and/or for enhancement of functionality specified in 3GPP LTE and/or LTE-A. In this respect, the terminology of 3GPP LTE and/or LTE-A is employed throughout the description. Further, exemplary configurations are explored to detail the full breadth of the present disclosure.

The explanations should not be understood as limiting the present disclosure, but as a mere example of the present disclosure's embodiments to better understand the present disclosure. A skilled person should be aware that the general principles of the present disclosure as laid out in the claims can be applied to different scenarios and in ways that are not explicitly described herein. Correspondingly, the following scenarios assumed for explanatory purposes of the various embodiments shall not limit the present disclosure as such.

According to the present disclosure, some of the drawbacks in some of the alternatives of series 3; e.g., 3C and 3D, shall be removed. Correspondingly, the present disclosure provides several embodiments with regard to an improved buffer status reporting and logical channel prioritization procedure.

As explained before for the prior art, there is so far only one MAC entity, even in carrier aggregation. So, it can only apply the Logical Channel Prioritization, LCP, procedure once, even if it receives grants from more than one cell/link. When the UE is requested to transmit multiple MAC PDUs in one TTI, steps 1 to 3 and the associated rules of the standard LCP procedure may be applied either to each grant independently or to the sum of the capacities of the grants. As a result of the user plane architecture option 3, the UE will have 2 MAC entities that receive separate grants from corresponding cell; but how the LCP will be run (e.g., one by one or aggregately) is not clear, especially for the shared bearer. Consequently, it is also not clear how the PBR allocation could work for such a bearer.

Figure 15:
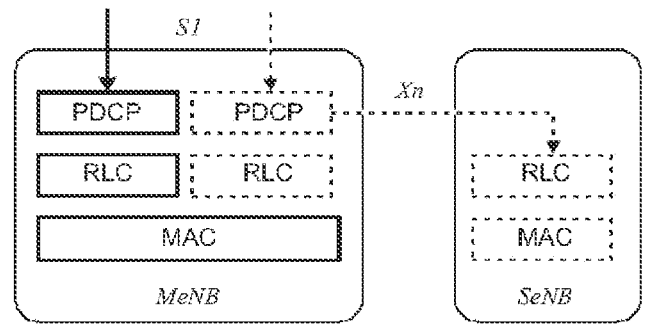

FIG. 15 schematically illustrates an S1-U interface terminating in MeNB, in addition to a radio bearer split in the MeNB, as well as independent RLCs for the split radio bearers. FIG. 17 schematically shows that in the UP architecture options 3C and 3D, the PDCP is a common entity for the RLC, MAC and PHY layers for the MeNB and SeNB.

In the following, the BSR will be considered first.

User plane architecture option Series 3 being considered in 3GPP, in particular in 3GPP document TR 36.842, allows a bearer split such that packets from a particular bearer(s) can be received/transmitted via more than one cell simultaneously from/to the UE.

In order to fulfil the QoS of all bearer(s) of each UE being served in the network, different UL activities, e.g., LCP, BSR, PHR and others can be linked so that, once the UE knows, e.g., how the BSR for the split bearer has to be reported to each link/cell, it can also derive how the PBR derivation shall be done for running LCP for this split bearer correspondingly in each MAC entity towards the individual participating cell(s) or vice versa. This can be further linked to PHR such that a specific PHR trigger may also trigger the BSR/PBR, etc., re-derivation/re-computation and even reporting in that sense a corresponding new trigger.

An option is then to use a fixed ratio which can be semi-statically used (until re-derived/re-configured) to derive for example the BSR and the LCP parameters like the PBR. The ratio could be semi-statically fixed (hereafter called 'fixed') until changed later upon a fresh derivation/signalling of the same.

An example thereof is illustrated in FIG. 18. As can be seen in the figure, for a ratio of 1:4 split of Logical Channel 2 (LC2)—BSR in MeNB is reported for 110 and 99 Bytes for LCG1 and LCG2 respectively. Moreover, 133 and 78 Bytes are reported to SeNB for LCG1 and LCG2 respectively.

More specifically, FIG. 18 schematically illustrates a UE side picture. Here, it is assumed that the BSR for only those channels are reported inside an LCG that are actually received/transmitted between the corresponding pair of MeNB-UE or SeNB-UE. As illustrated, in this embodiment, there are two MAC entities in the UE, namely MAC-MeNB and MAC-SeNB, that calculate the buffer size corresponding to their part of the logical channels. In particular, in this example there are two Logical Channel Groups, LCG1 and LCG2, where LCG1 has Logical Channels LC1 and LC4, while LCG2 has Logical Channels LC2 and LC3. As can be seen, only LC2 is the Split Bearer whose packets are transmitted/received via both the MeNB and SeNB. Calculation of the Buffer Status Report adds the BO for all logical channels. BO for each Logical Channel is RLC Buffer+PDCP Buffer. Further, the RLC BO (Buffer Occupancy) is only reported to the corresponding Node, i.e., not shared, since RLC is per eNB. PDCP buffer is shared/split between the corresponding MACs only if the related logical channel is split, otherwise not.

Therefore, for LC1, as an example, BSR to be reported to MeNB by MAC-MeNB is a simple sum of PDCP BO for LC1 (100 Bytes)+RLC BO for LC1 (10 Bytes), and therefore, MAC-MeNB calculates the buffer size corresponding to the logical Channel LC1 as 110 Bytes. Since LCG1 for MAC-MeNB is only consisting of LC1 (LC4 also belonging to LCG1 refers to SeNB), the Buffer Status reported to MeNB (by MAC-MeNB) for LCG1 is 110 Bytes.

Taking the example of Split Bearer case, LC2, since the example ratio is 1:4, namely one part to the MeNB and four parts to the SeNB, the PDCP BO gets split in this ratio. That is, PDCP BO to be reported to MeNB by MAC-MeNB for LC2 is 80*1/5=16 Bytes. Since LC3 is also part of LCG2, the PDCP BO of LC3 is added directly, since LC3 is not a split-bearer. Therefore, PDCP Buffer Occupancy for LCG2 to be reported to MeNB by MAC-MeNB is 76, that is, 16+60 Bytes. Additionally, since the Buffer Status Report is the sum of PDCP BO+RLC BO, the corresponding BSR adds the RLC BOs to this value. Therefore, MAC-MeNB calculates the buffer size corresponding to the logical Channels LCG2 as 99 Bytes, namely 76+11+12 Bytes. Conversely, for reporting to the SeNB, the remaining part of the PDCP BO for LC2 is used, namely 80*4/5=64 Bytes, to which the RLC BO is added, in this example, another 14 Bytes, resulting in a total reported value to the SeNB of 78 Bytes.

In the above example 1:4 is only taken as an exemplary ratio; could be represented also as 1/5:4/5 or 0.2:0.8. As another example, if the UE has 100 Bytes of data to be sent in the UL for a particular split-bearer and the ratio derived and signalled by the network is 2:3 between the MeNB and SeNB for the same bearer, then the UE should report a buffer occupancy of 40 Bytes to the MeNB and 60 Bytes to the SeNB. According to one advantageous implementation, this ratio is based primarily on how much traffic the network wants to offload to the Small Cell (e.g., 10%, 50%, 99% or 100%).

If, e.g., the ratio is 100%, then all the traffic shall be offloaded to the Small Cell. Considering a corresponding ratio of 0:1, namely nothing to the MeNB and all to the SeNB, the PDCP BO gets split accordingly. When presuming the PDCP and RLC buffers of FIG. 18, this would result in the following. For logical channel LC2, the PDCP BO to be reported to the MeNB by MAC-MeNB is 0 bytes. As before, since logical channel LC3 is also part of the group LCG2, the PDCP BO of 60 bytes for logical channel LC3 is added, and in this case completely due to not being a split bearer. Therefore, PDCP BO for group LCG2 to be reported to the MeNB is 60 bytes. To the 60 bytes for the PDCP BO, the corresponding RLC BOs for group LCG2 are to be added; this adds another 11 bytes and 12 bytes for logical channels LC2 and LC3 respectively.

Conversely, for the BSR report to the SeNB, the full PDCP buffer for the split bearer is reported. In particular, the 80 bytes in the PDCP buffer for LC2 are added completely to the RLC BO of 14 bytes for LC2. Thus, the complete BSR reports a total value 94 bytes (80+14).

This applies correspondingly to a special ratio of 0%, or 1:0, i.e., to the case where no traffic shall be offloaded to the Small Cell. In this case, the full PDCP buffer for the split bearer LC2 is reported to the MeNB (in addition to the 60 bytes for LC3, and the RLC BO for LC2 and LC3), and nothing of the PDCP buffer for the split bearer LC2 is reported to the SeNB (although the RLC BO for LC2 is non-zero and still reported to the SeNB).

The particular split ratios of 1:0 and 0:1 have the advantage of a simplified UE behavior with respect to the BSR procedure for the split bearer cases.

It is further advantageous, if buffer status reports are actually only reported when the value of the BSR is not zero. Put differently, especially in the above-mentioned cases where the PDCP BO may be 0 due to the special split ratio of 1:0 or 0:1, the BSR basically reports the BO for the RLC layer, i.e., RLC BO reflecting the status of the received RLC PDUs in the downlink, to the SeNB. However, for those cases where no data is in the buffer for the RLC layer (in this case for LC2), the corresponding BSR that would be computed would have the value 0. Consequently, according to an advantageous embodiment, these kind of BSR which would report a value of 0 shall not be transmitted.

The fixed ratio can, for example, be derived by the network and signalled to the UE. In some implementations, the MeNB is in charge of defining the ratio value, for instance by taking input such as the SeNB load factor from SeNB as well. In one embodiment, the eNB could signal the ratio value to the UE using RRC Signalling (e.g., while (re)-Configuring a Bearer) or using MAC Signalling.

This ratio can tell the UE what fraction of the buffer needs to be reported to each of the participating cells for a particular split-bearer or, alternatively, to all the split-bearers, therefore it can be implemented by using only one ratio per UE.

In some embodiments, the network nodes MeNB and SeNB can share this allocated ratio information so that eNBs not only know how much UL grant will be provided to the UE by the other eNB, for instance in the next few TTIs. This can give an indication of the resource/UL power usage of the other link, and then each link may provide its resource/UL power usage accordingly.

For the particular ratios of 1:0 and 0:1 (i.e., no/full offloading to small cell), the network can signal how to split the total buffer occupancy of the PDCP layer in different ways, as will be explained in the following. For instance, the network may already indicate in the bearer configuration, which link should be used for the BSR reporting for PDCP data as explained above. This may be done, e.g., by a Radio Resource Control (RRC) message, e.g., by a radio resource configuration message. According to a first signalling implementation, a flag may be introduced for a logical channel associated with a split EPS bearer. The flag is thus indicating whether the UE should report PDCP data in the buffer within a BSR for this logical channel or not. For instance, the flag may be included in the logicalChannelConfig information element, defined in the standard TS36.331, in a similar way as the logicalChannelSR-Mask Information Element (IE). Alternatively, the definition of the "data becoming available" in the technical standards TS 36.323, TS36.322 and TS 36.321 can be reused in said respect, such that the PDCP data shall only be considered for the BSR reporting and optionally also for BSR triggering as "data becoming available" when the flag is set. This flag would basically indicate which of the two logical channels for a split bearer is used for BSR reporting of PDCP data. One of the two logical channels, either the one used for transmissions towards the MeNB or the one towards the SeNB, would be enabled for BSR reporting of PDCP data, whereas the other one would be disabled (or suspended) for BSR reporting of PDCP data.

According to a second signalling implementation, a new information element may be specified in either the MAC-MainConfig IE or DRB-ToAddMod IE (already standardized in TS36.331), thus indicating whether the PDCP data of a split bearer shall be considered by a specific radio bearer or logical channel for BSR reporting or not.

Moreover, even if one of the links is configured to be disabled or suspended for BSR reporting of PDCP data of a split bearer, this link is still used for reporting RLC data of a split bearer, e.g., RLC STATUS PDUs, to the corresponding eNB. MAC Control elements (MAC CEs) like BSR or PHR which are also transmitted in the uplink are not radio bearer specific data and hence are not in the scope of this present disclosure.

How the network, for instance the MeNB, derives the ratio could be based on some specific criteria like cell load of participating cell, offloading requirements, such as how much traffic needs to be offloaded to SeNB, UE's UL channel conditions, such as which link is better/worse, QoS factors such as packet delay/bearer latency requirements, etc.

The BSR allocation may only apply to the buffer occupancy in the PDCP sub-layer, as in 3GPP document TS 36.323, but not, e.g., to RLC sub-layer which may be reported "as-is," i.e., without any further splitting between the MeNB and SeNB.

Further, the above ratio-based splitting may be subject to some "Certain Minimum Traffic/buffer" which may be configured to the UE or specified. For instance, the certain minimum range will be configurable, i.e., when the network configures a bearer to the UE using an RRC Connection Reconfiguration message; it may say that up to Index 20 of Table 6.1.3.1-1: Buffer size levels for BSR (as described in 3GPP TS 36.321-a40) is considered as below certain minimum range.

When the buffer occupancy of the combined PDCP and RLC is less that this minimum threshold, then the UE may rather send its UL data to only one of the link; the link itself could be based on UE's choice or could be pre-configured together with the minimum traffic/buffer occupancy. As one possible alternative of this enhancement, the bearer type (e.g., signalling or specific data bearer like streaming, background, etc.) may determine that the UE may only use a particular link for this data transmission. The choice of link/bearer itself could be pre-configured/specified or based on UE's implementation choice.

According to a further embodiment, which may be used in addition or alternatively to the above and below described embodiments regarding the BSR splitting, any acknowledgements of the TCP layer associated with TCP downlink data received in the UE are always to be transmitted to the MeNB. This is independent from whether the TCP ACKs refer to data received via the SeNB, and/or independent from whether or not other uplink data is transmitted by the mobile node to the MeNB or SeNB.

TCP acknowledgements are transmitted in the uplink for each TCP downlink data packet received by the UE. Usually, TCP acknowledgements are processed as exemplified in FIG. 7, thus being encapsulated in the IP layer and further by the PDCP layer as a PDCP PDU, etc. In order to force all TCP ACKs to be transmitted to the MeNB, the UE must detect these TCP ACKs (or at least those TCP ACKs that would otherwise be transmitted to the SeNB) and forward them over the appropriate logical channel to the MeNB (instead of to the SeNB). This may be achieved by the UE according to different implementations, some of which will be explained in the following.

According to a first implementation, inter-layer notification(s) may be defined between the TCP and the PDCP layers, thus allowing the PDCP layer to identify the TCP ACKs and forward them to the appropriate RLC entity for further processing and transmission to the MeNB.

Alternatively, the PDCP layer may detect the TCP ACKs directly, i.e., without any inter-layer notification from the above layers, based, e.g., on some implementation rules. For instance, usually TCP ACKs have a fixed PDCP PDU size, and may thus be distinguished from other PDCP PDUs. Alternatively, the TCP/IP header identifies the data to relate to a TCP ACK.

These detection procedures may be performed by the PDCP layer before IP header compression.

In any case, the UE shall be able to direct all the TCP ACKs to the appropriate lower layers, for transmission to the MeNB.

As evidenced by simulation results, the TCP performance is directly related to the RTT (Round Trip Time)/delay. Thus, the downlink throughput would be optimized/increased when the TCP ACKs do not experience the additional X2 delay between the SeNB and the MeNB, and the TCP RTT is reduced.

As mentioned before, this particular embodiment where all TCP ACKs are to transmitted to the MeNB, may be used in combination with any of the embodiments relating to the split ratio when calculating the BSR and when deactivating uplink transmission of PDCP data for a split bearer to one of the MeNB and SeNB. In these particular cases however, when the split bearer to the MeNB is deactivated (i.e., all traffic shall be offloaded to the SeNB), the TCP ACKs shall not be offloaded but shall be transmitted to the MeNB (even though they are actually processed by the PDCP layer). This would allow the offloading of traffic to the SeNB, which is nearer to the UE, but would at the same time enhance the TCP performance as explained above, by transmitting all TCP ACK to the MeNB.

For said reason, TCP uplink ACKs shall be treated as an exception to the described procedure and must also be considered for the buffer status reporting.

As explained for the above embodiment, when the ratio is 0:1 (i.e., all PDCP data is transmitted in the uplink to the SeNB, and the BSR is split by 0:1 with regard to the PDCP BO), the PDCP buffer occupancy for TCP ACKs shall be indeed considered for the BSR reporting; as an exception to the above-mentioned embodiment. In particular, any TCP ACKs occupying the PDCP buffer shall be reported to the MeNB in the corresponding BSR, but shall not be reported to the SeNB; TCP ACKs shall be thus treated differently from other data in the PDCP buffer, for which the split ratio shall indeed be applied. In other words, the split ratio, even when configured for the BSR reporting, shall not be applied to TCP ACKs in the PDCP buffer.

Alternatively to the embodiment where the network determines the ratio, the fixed ratio could for example be derived by the UE itself, based on a variety of input parameters including one or more of the following but not limited to:

Radio thresholds/HARQ re-transmissions (e.g., use a better radio link more than a poor radio link)

History: Past grants received (higher grants received from a particular cell would lead to higher ratio in its favor)

Generally, the UE's ratio derivation can be a function of these parameters such that a more favorable cell, for example, which gave more grants in the past time, such as 10/100/1000 ms, or which had a smaller HARQ operating point, receives a higher BSR/PBR ratio.

The ratio could be informed to the network by UL RRC or MAC signalling, enabling the network node(s) to know how much buffer occupancy is being reported to the other node for the split-bearer.

In addition, for the non-split-bearer(s) that is received/transmitted between the UE and only one of the Network Nodes, i.e., so to say the Single Connectivity bearer, the buffer occupancy of these could be reported to the 'other node'. In other words, for instance, in FIG. 18, 110 and 133 Bytes could be reported to the other nodes (SeNB and MeNB respectively); this provides an indication to determine if the UE will have high/low resource allocation (for example >1 Mbps) from the other node. Accordingly, the MeNB/SeNB may schedule the UE to minimize conflicts while allocating the radio resources including and affecting UE transmission power.

The buffer status is reported by a UE not per Logical Channel but for a Logical Channel Group. A Logical Channel Group may contain Logical Channel(s) for Split Bearer (s) as well as Logical Channel(s) for non-Split Bearer(s). The buffer status for Logical Channel(s) for non-Split Bearer (s) may be reported to only the corresponding eNB (i.e., Buffer Status for a non-Split Bearer towards MeNB should be reported to only MeNB; and similarly for SeNB). As a further enhancement, the buffer status for a non-Split Bearer towards MeNB may also be reported to SeNB and vice-versa. This will for example help the Master base station (MeNB) to determine how much scheduling the UE might receive in the next few subframes from the secondary base station, and accordingly the master base station may schedule the UE to minimize conflicts while allocating the radio resources. This could be for example helpful while estimating the UE's total transmit power requirement in the next few subframes. This enhancement can be accomplished by configuring (by the network towards the UE) and UE including in the Buffer Status Report 2 parts, one each for MeNB and SeNB.

As for reporting BSR for Logical Channel(s) for Split Bearer(s): The Logical Channel for Split Bearer(s) should be configured as a separate Logical Channel Group, i.e., not including any Logical Channel(s) for Non-Split Bearer(s) in this group by the network. Mapping of bearers to a LCG should still be done in accordance to the priority of the bearers. Essentially only bearers of the same priority should be mapped into the same LCG. Therefore, if split Bearers have a different priority they should presumable end up in separate LCGs.

So, buffer status for all the Logical Channel(s) for Split Bearer(s) can be reported together in a LCG of its own. This may require the network to configure more than 4 LCGs, as is (maximum 4 LCGs) currently the case. In this case, network may internally decide (using Xn interface) to serve the UE in a specified ratio.

Or, alternatively, buffer status for the Logical Channel(s) for Split Bearer(s) may be computed for the UE as a whole (no segregation for MeNB/SeNB, i.e., such that all PDCP BO is reported) and reported to either/both of the eNB inside the corresponding LCG.

In the case when reporting the BSR (e.g., for split-bearer) to only one of the Nodes, the UE could choose the node based on:

History, such as HARQ re-transmissions, Previous allocations, etc., to maximize the use of the link that is more suitable according to the UE's UL channel condition and resource availability in that Node.

The particular node could also be configured to be selected as part of network policy that might dictate that under following situations, the UE is supposed to choose a particular cell for BSR reporting:

Radio Threshold, for instance, if DL RSRP, UL HARQ operating point, etc., are above a certain threshold then choose cell X for BSR reporting, buffer occupancy, for instance, if BO is less than a predetermined value Threshold1 then choose SeNB, Choose the Cell to send the BSR where a D-SR, dedicated SR on PUCCH. is configured, Some UE implementation way.

As a possible enhancement, the UE can send the BSR to the other cell/link if the first cell/link did not provide much/any grant in a specified amount of time such as, after the expiry of N retxBSR-Timer; where N is an integer greater than or equal to 1; for instance, if the first cell provided less than 50% of the grants that the UE asked for.

As yet another solution, the ratio values 0 (0:1), infinity (1:0), etc., could be used to switch off one of the links completely. For example, if the ratio 0 is signalled using the MAC signalling, then the UE will stop using the first link (e.g., MeNB) completely (corresponding split bearer or all the bearers depending on what the ratio denotes). Similarly, if the ratio infinity is signalled, then the UE will stop using the second link (e.g., SeNB).

In a more detailed implementation, the split ratios of 0:1 and 1:0, already considered for the BSR calculation as explained above, may in addition or alternatively be used to deactivate the split bearer to either the MeNB or the SeNB for transmitting data from the shared PDCP entity in the uplink. For instance, in line with the BSR reporting when the PDCP BO is fully reported to the MeNB for a split ratio of 1:0, the bearer to the SeNB may be deactivated or suspended and thus not used for transmitting any uplink data, processed by the PDCP layer, to the SeNB. Conversely, in line with the BSR reporting when the PDCP BO is fully reported to the SeNB for a split ratio of 0:1, the bearer to the MeNB may be deactivated or suspended and thus not used for transmitting any uplink data, processed by the PDCP layer, to the MeNB.

This has the advantage that the UE behavior is simplified for the LCP procedure for those split bearers, since bearer splitting thus effectively only occurs in the downlink. Since all the uplink data (except RLC data) goes only to one eNB, the UE does not need to determine how to split the PDCP buffer occupancy between the two eNBs.

Figure 16:
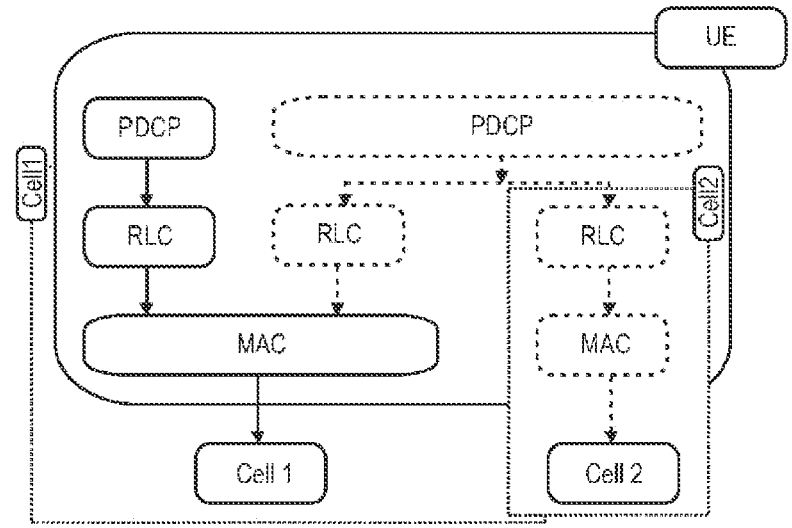
Figure 19:
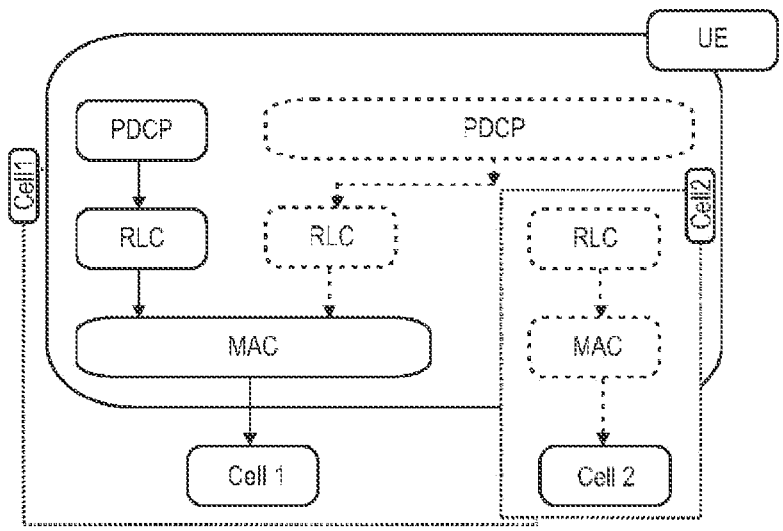
Figure 20:
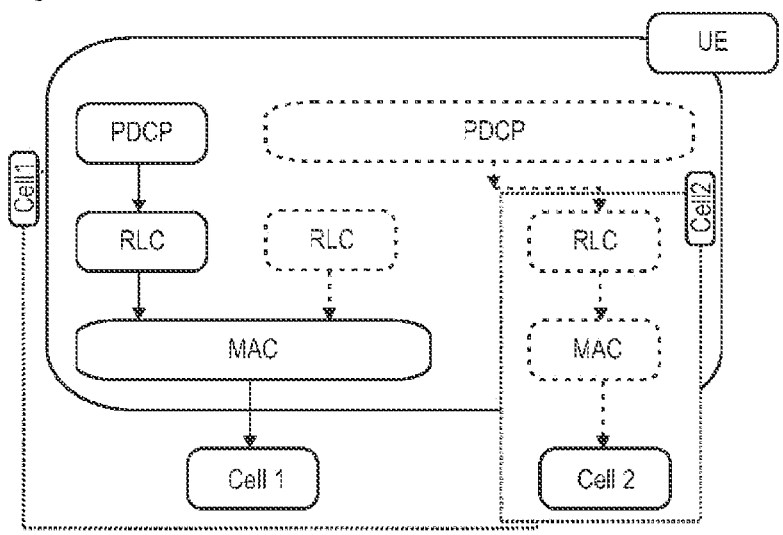

FIG. 19, which is similar to FIG. 16, exemplarily illustrates the deactivation of the bearer to Cell 2 (the SeNB), in that the shared PDCP layer (entity) forwards everything down to only the RLC layer entity for Cell 1 (i.e., towards MeNB). FIG. 20 depicts the case where the bearer towards the MeNB is deactivated, and thus the shared PDCP layer (entity) forwards everything down to only the RLC layer entity for Cell 2 (i.e., towards the SeNB).

As already mentioned above, even if one of the links is configured to be disabled or suspended for uplink transmissions of PDCP data of a split bearer, this link is still used for transmitting RLC data of the split bearer, e.g., RLC STATUS PDUs, to the corresponding eNB. In other words, data that originates from the RLC entities may still be transmitted to the corresponding base station, independent from the split ratio and deactivation of a split bearer. Furthermore, MAC Control elements (MAC CEs) like BSR or PHR which are also transmitted in the uplink are not radio bearer specific data and hence are not in the scope of this present disclosure; they are further transmitted to the corresponding base station. As apparent from FIG. 19, data as generated by the lower layers of the PDCP (RLC, MAC) are still forwarded via Cell 2 to the SeNB.

Optionally, A further exception relates to TCP acknowledgements, i.e., acknowledgments sent from the UE TCP layer in response to TCP downlink data received in the UE. As explained in a further embodiment, TCP Acknowledgements shall always be transmitted to one configured eNB, i.e., the MeNB, and thus in a split bearer case, TCP ACKs shall be forwarded from the PDCP layer to the corresponding lower layers so as to be further forwarded to the MeNB; this shall be the case even for TCP ACKs which relate to TCP downlink data received from the SeNB, and even for the above case, where all PDCP data (which includes the TCP ACKs processed by the PDCP layer) is supposed to be transmitted to the SeNB.

This could, e.g., lead to the scenario where all data is offloaded to the SeNB, with at least the exception of having all TCP uplink ACKs being sent to the MeNB. According to another embodiment optionally, also PDCP status PDUs are sent always to one predefined eNB, e.g., MeNB in order to avoid the additional Xn delay. Similar to the TCP Acknowledgments, the PDCP entity would always forward a PDCP status report to the corresponding lower layers so as to be further transmitted to the MeNB independent from a split ratio or deactivation of a bearer. This could, e.g., lead to the scenario where all data is offloaded to the SeNB, with at least the exception of having all PDCP status PDUs being sent to the MeNB.

The UE may be informed about the split ratio, and thus about which link of the split bearer to deactivate for the PDCP uplink data in various ways by the MeNB. As has been already explained in connection with the split ratio used in connection with the BSR calculation, the network may already indicate in the bearer configuration, whether the particular link should be used for transmitting the PDCP uplink data or not; i.e., whether the particular link should be deactivated with respect to transmitting PDCP uplink data. This may be done by a Radio Resource Control (RRC) message, e.g., by a radio resource configuration message.

According to a first signalling implementation, a flag may be introduced for a logical channel associated to a split EPS bearer. The flag is thus indicating whether the UE should use the particular logical channel for transmitting the PDCP uplink data or not (and may additionally indicate whether to report PDCP data in a BSR for this logical channel or not). For instance, the flag may be included in the LogicalChannelConfig information element, defined in the standard 36.331 in a similar way as the logicalChannelSR-Mask Information Element (IE). Alternatively, the definition of the "data becoming available" in the technical standards TS 36.323, TS36.322 and TS 36.321 can be reused in said respect.

According to a second signalling implementation, a new information element may be specified in either the MAC-MainConfig or DRB-ToAddMod (already standardized in TS36.331, thus indicating whether the UE should use the particular radio bearer or respectively logical channel for transmitting the PDCP uplink data or not (and may additionally indicate whether to report PDCP data for transmission on this radio bearer or logical channel or not).

The above-described BSR derivation ratio could also be used to run the Logical Channel Prioritization procedure, e.g., by using the same, or a derived ratio to split the PBR (prioritisedBitRate). For example if a PBR of 'kBps128', i.e., 128 Bytes per TTI is allocated in the ratio 1:3, i.e., for each Byte on MeNB, SeNB gets 3, then the effective PBR on those links will be 32 and 96 respectively. With these derived PBRs, the LCP Procedure can be run in the 2 different MAC sub-layers, for corresponding 2 different cells/links, as defined in the Logical Channel Prioritization as defined in Section 5.4.3.1 of TS 36.321.

However, if no fixed ratio approach has to be used, then another alternative would be to use a Virtual Bucket Approach. In this approach MAC-1, corresponding to cell/link1, can run the LCP as usual and update the satisfied PBR situation (defined "Bj" as in Section 5.4.3.1 of TS36.321, here incorporated by reference) of the split-bearer accordingly; the MAC-2, corresponding to cell/link2, can run the LCP as usual but taking for the split-bearer the new value ("Bj" as in Section 5.4.3.1 of TS36.321) updated by the MAC-1 accordingly.

As to which MAC entity, for which link, should start to run the LCP procedure first, there can be several mechanisms. This could be left to UE implementation; for instance some UE implementation may always start with the SeNB, and others may always start with the MeNB; alternatively, other UE implementation may decide randomly, or based on the grant that was received earlier for one of the links.

In one possible example, if most for instance more than 50% of the grant was provided by a particular eNB, then the UE can start with this eNB's grant. As a further option the UE could toggle the first MAC (cell/link) based on a similar criteria or could even be configured by the network, for instance by starting with the cell (BO occupancy corresponding to this cell) which has less unhappiness in terms of less aggregated data to be transmitted, etc. The Unhappiness can be calculated by aggregating the unsatisfied PBR and/or the remaining amount of the data in the buffer. Further, in the MAC entity selected this way, the highest priority Bearer's unhappiness can be minimized first by allocating the extra grants to it and then going on to the lower priority unhappy bearers sequentially.

As an alternative solution to when no fixed ratio approach has to be used, the network could configure the division in time, such as in TDM fashion, of when which MAC will run the LCP considering the split bearer(s). The other MAC does not consider this split bearer(s) for these time slots but otherwise run the LCP normally for all other bearer(s).

As a further alternative solution to when no fixed ratio approach has to be used, more Steps could be added to the procedure described in Section 5.4.3.1 of 3GPP TS36.321 such that first CP is run normally in both the MAC entities and then one of the MAC that has highest unhappiness tries to reduce the unhappiness by taking off the allocations to the split bearer such that a Negative Bj, if any, of the split bearer just gets back to 0. These grants are then distributed to other bearer(s) if their Bj was still positive, else (or if the grant was still remaining) allocating the grant to other high priority bearers, starting with the highest priority bearer that has still any data in its buffer such that the highest priority Bearer's unhappiness can be minimized first by allocating the extra grants to it and then going on to the lower priority unhappy bearers sequentially.

In the following, further alternative approaches will be disclosed.

As a yet another alternative solution to when no fixed ratio approach has to be used, the grants from all the cell/link could be aggregated as one grant, and then the LCP procedure could be run such that the sum of the so far allocated grant to the logical channels in a cell does not exceed the grant that was coming from that cell, and, when this happens, the LCP procedure shall allocate grant to the remaining Logical Channel of the other MAC-cell.

As yet another alternative for Logical Channel Prioritization, the network (RRC) could configure the split-bearer as two separate configurations, corresponding to two different cells, in the UE such that the PBR (prioritisedBitRate) or other parameters that RRC controls for the scheduling of uplink data by signalling for each logical channel has different values for each PBR (prioritisedBitRate) or other parameters that RRC controls for the scheduling of uplink data.

Thereafter, each MAC entity in the UE may run its LCP independently. What values of such parameter could be configured might be a decision similar to "ratio" derivation that was described above. As an implementation option the UE could also configure itself in this similar manner, that is, configure internally the split-bearer as two separate configurations.

Further, putting the different UL Scheduling procedures together can be done such that these not only share, for example, the ratio but also the trigger. This could for example happen when one of the cell goes down (like meets RLF or cannot be used for a similar reason), then the UE should report the BSR, PHR assuming no transmission for the bad link and change the ratio (that is used to work out the BSR, LCP and even PHR) such that it is clear to the receiving network node that the other link is down and/or that it needs to/can provide a higher grant (power, physical resources) to the UE and also initiate a subsequent necessary procedure including the mobility of the UE to some other cell using, e.g., the Handover Procedure. In this cell a change of one situation like Power (PHR report) may subsequently trigger the other reports like BSR, and also the UL logical channel prioritization should also account for these changes such that a split-bearer does not suffer/suffers minimally in the transmission. So, whenever RLF happens, the UE could signal using special reporting (implicitly or explicitly) in one of these reports/procedure that RLF has happened, and then the network could initiate some kind of recovery mechanism.

In the following a further embodiment of the present disclosure will be described according to which the Logical Channel Prioritization procedure considers the split bearer, and particularly the split buffer status reporting as introduced in any of the previous embodiments.

According to one of the previous embodiments, the PDCP buffer for the split bearer (e.g., LC2 in FIG. 18) is shared between the radio bearer to the MeNB and the radio bearer to the SeNB. This may lead to a waste of uplink grant during the LCP procedure as will be exemplified by the following scenario.

The UE is assumed to be configured with an eNB-specific bearer RB1, mapped only to the MeNB, and with a "split bearer" RB2, mapped both to the MeNB and the SeNB. Additionally, BSR reporting for the split bearer RB2 shall be configured with a ratio of 0.4 to 0.6. Assuming that 100 bytes of (PDCP) data arrive for both bearer simultaneously, the UE would correspondingly send a first BSR1 with 140 bytes (100 bytes+0.4*100 bytes) to the MeNB, and a second BSR2 with 60 bytes (0.6*100 bytes) to the SeNB.

First, the UE is scheduled with a grant of 140 bytes from the MeNB. Provided the Logical Channel priority of RB2 is higher than priority of RB1 and when performing the common LCP procedure for a split bearer as described in the embodiment above, the UE sends 100 bytes of data via RB2 towards MeNB, and 40 bytes of data via RB1 towards MeNB. Later, the UE receives another grant of 60 bytes from the SeNB. However, there is no data left for any bearers mapped towards the SeNB, and the UE may not use the grant from the SeNB for data towards the MeNB. Thus, the UE sends padding bytes to the SeNB, and the data of RB1 pending for uplink transmission towards MeNB waits in the UE buffer, until the MeNB receives new information on the buffer status, e.g., via a periodic BSR. As apparent, the present LCP procedure is inefficient when implementing the embodiments where the PDCP buffer occupancy is split and only a split PDCP BO is reported to the eNBs.

According to this further embodiment, the LCP procedure is adapted to consider that only part of the PDCP BO is reported to the two eNBs. In particular, at least the first and third steps of the LCP procedure would be specified in a similar manner as follows:

Step 1: All the logical channels with Bj>0 are allocated resources in a decreasing priority order. If the PBR of a radio bearer is set to "infinity", the UE shall allocated resources for all the data that is available for transmissions on the radio bearer before meeting the PBR of the lower priority radio bearer(s), but only up to a maximum of the buffer occupancy reported to the base station;

Step 2: if any resources remain, all the logical channels are served in a strict decreasing priority order (regardless of the value of Bj) until either the reported data for that logical channel or the UL grant is exhausted, whichever comes first. Logical channels with equal priority should be served equally.

Therefore, when performing the two LPC procedures (one for each direction of the split bearer, towards the MeNB and SeNB), in the above mentioned scenario a waste of resources is avoided. In this example, When receiving the first grant of 140 bytes from the MeNB, instead of serving resources for sending all 100 bytes of data of the RB2 to MeNB, only 40 bytes are transmitted by the UE via RB2 to the MeNB, since only 40 bytes were reported with the BSR1 regarding the RB2. Out of the remaining 100 bytes of this first grant from the MeNB, 100 bytes are spent to transmit the 100 bytes of data waiting for RB1 towards the MeNB. Then, when receiving to the second grant of 60 bytes from the SeNB, the remaining 60 bytes waiting for RB2 are transmitted using a corresponding amount of resources from this second grant.

For the case that one radio bearer or logical channel of a split bearer is deactivated or suspended for UL transmission of PDCP data, the LCP procedure will only consider data in the RLC entity of this disabled/suspended logical channel but no data available in the PDCP entity for this disabled/suspended logical channel.

According to another further embodiment, the LCP procedure for split bearers considers a virtual PDCP buffer for each of the link/bearers the split bearer is using in the uplink. Since the PDCP entity is shared between the two RLC/MAC entities in the case of a split bearer as shown in FIG. 16, the UE is creating a virtual PDCP buffer/entity for each of the cells which are used in LCP procedure in the two MAC entities. The PDCP buffer occupancy of a virtual PDCP entity/buffer is calculated by the PDCP buffer occupancy of the shared PDCP entity multiplied with the configured split ratio. For example, in case the PDCP buffer occupancy of the shared PDCP entity is 100 bytes at one time instance and the configured split ratio is 0.4 to 0.6, then BO of the virtual PDCP buffer/entity for Cell 1 (towards MeNB) is 40 bytes whereas the BO of the virtual PDCP buffer/entity of cell (towards SeNB) is 60 bytes. The advantage of the virtual PDCP buffer/entities is that the normal LCP operations can be done for a split bearer as described in above embodiment.

In the following, a further embodiment of the present disclosure will be explained. It is assumed that a split bearer is present, i.e., an EPS bearer is split across MeNB and SeNB. However, it is yet unspecified how the triggering of the BSR by the MAC entities will be handled by the UE. When data arrives in the buffers of the split bearer and a BSR is triggered in MAC entity (be it MAC-MeNB or MAC-SeNB), the other MAC entity (MAC-SeNB or MAC-MeNB) might not be triggered.

According to a first option, the BSR trigger in one of the MAC entities for the split bearer is indeed not propagated to the other MAC entity. Rather, the one MAC entity shall report the BSR to its corresponding base station, while the other MAC entity shall report the BSR when triggered itself (e.g., by arrival of data, or by a periodic BSR trigger). The corresponding split-ratios can be considered for the respective calculation of the two BSR. In this case, the reporting by the two MAC entities of the split bearer is completely independent, which facilitates implementation.

According to a second option, the BSR trigger in one of the MAC entities (be it MAC-MeNB or MAC-SeNB) is propagated to the other MAC entity, such that this other MAC entity will also internally trigger the BSR; effectively, the MAC entities of the split bearer will always be triggered together to report the BSR and thus two buffer status reports are to be transmitted, one to the MeNB and one to the SeNB. However, depending on how the uplink resources for the BSR reporting are scheduled, the two transmissions of BSR are likely to happen at different times in the two cells. Therefore, the buffer occupancy of the split bearer might have changed, i.e., new data could arrive in the buffer between the two transmission time instances, which leads to problems on how to handle such situations, especially with regard to the later BSR report.

This embodiment thus also deals with the question of how the two BSR are to be calculated with respect to each other, and different options are possible, four of which will be explained in greater detail. T0 shall be the time at which the two MAC entities are triggered for BSR reporting; T1 shall be the time at which the first BSR is scheduled to be transmitted (be it the BSR-MeNB, or the BSR-SeNB); correspondingly, T2 shall be the time at which the second BSR is scheduled to be transmitted (be it the BSR-SeNB or the BSR-MeNB).

According to a first calculation option, both of the BSR are calculated based on the buffer occupancy at either T0 (i.e., when the BSR are triggered) or at T1 (i.e., when the first one is to be transmitted). The split-ratio can be respectively applied for the calculation of the two BSRs. UE needs to store the PDCP buffer occupancy at T0 or T1 in order to perform the calculation of BSR at T2.

According to a second calculation option, the first-timed BSR is calculated with the buffer occupancy at either T0 or T1, and then transmitted as scheduled at T1. Then, the second-timed BSR is calculated to be the buffer occupancy at time T2, minus what was already reported by the first-time BSR; i.e., equal to BO_T2-reported_BO_T1/0. Thus, although at time T0 or T1, the split ratio can be applied to this firstly-timed BSR, for the secondly-timed BSR the split-ratio shall not be applied, since the value of this secondly-timed BSR reflects the difference of the BO at T2 vis-a-vis the reported BO at time T1 or T0. The advantage of this second calculation option is that the entire buffer occupancy is reported to eNBs.

According to a third calculation option, the two BSRs are calculated independently from each other at basically the corresponding times when they are transmitted. Thus, the firstly-timed BSR is calculated based on the BO at time T1, while the secondly-timed BSR is calculated based on the BO at time T2. Again, in both cases the split-ratio may be applied respectively, as explained in one of the various embodiments discussed before. This option has the advantage that the BSR reporting procedure can be performed independently in the two MAC entities which is preferable from implementation point of view.

According to a fourth calculation option, the firstly-timed BSR (e.g., for the MeNB) is calculated at time T1 based on the BO at time T1 (with use of the corresponding split ratio). Furthermore, at time T1 also the value for the other BSR (e.g., for the SeNB) is calculated based on the BO at time T1 (with use of the corresponding split ratio); however, this one is not transmitted but merely stored for later use. In particular, at time T2 the UE shall calculate a BSR based on the newly-arrived data (i.e., data arrived between T1 and T2) (also applying the split ratio accordingly), and add this to the stored value of the BSR (e.g., for the SeNB) as calculated at time T1. The thus resulting value is then reported at T2, as scheduled.

The differences of these four options will be illustrated according to the following exemplary scenario. It is assumed, that the buffer status at T0 and T1 is 100 bytes. New data of 200 bytes is supposed to arrive between T1 and T2. A split ratio of 0.3 to 0.7 for MeNB to SeNB is defined. At time T1 the BSR for the MeNB is scheduled; at time T2 the BSR for the SeNB is scheduled.

TABLE 2

|  | BO reported at T1 | BO reported at T2 |
| --- | --- | --- |
| Option 1 | 30 (0.3 * 100) | 70 (0.7 * 100) |
| Option 2 | 30 (0.3 * 100) | 270 (300 − 30) |
| Option 3 | 30 (0.3 * 100) | 210 (0.7 * 300) |
| Option 4 | 30 (0.3 * 100) | 210 ((0.7 * 200) + 70) |

This present disclosure further looks into the aspect of transporting the Signalling Radio Bearer (RRC Signalling messages) between the MeNB and UE RRC using the Layer 2 scheduling/Transport of UE-SeNB link.

In Normal circumstances for Signalling Radio Bearer (RRC Signalling messages) Layer 2 transport only RRC->PDCP->RLC-M->MAC-M might be sufficient; but we need to have the other possibility of RRC->PDCP->RLC-S->MAC-S for the same SRB at some special conditions like when the MeNB would want to have RRC Diversity (i.e., sent the RRC message via both MeNB and SeNB links so as to ensure that the UE receives the RRC Signalling message through at least one link) or when the Radio Link has failed towards one of the eNBs and the UE may want to send a reporting message to report the situation (including Measurements) to the RRC in MeNB (via the available MeNB or SeNB link).

Layer 2 transports of SRBs, in the DL, from the UE's perspective would mean that the UE needs to be configured for receiving some SRBs from SeNB as well. Since MAC-S will anyway be available (corresponding to SeNB), the only further configuration required would be likely for RLC-S. If the RLC-S configuration would be exactly the same as RLC-M, then UE implementation can ensure that SRB packets are delivered to RRC by both MAC-M and MAC-S similarly, e.g., by having a SAP (Service Access Point) between the MAC-S and RLC-M; this enhanced implementation aspect works such that this SAP is always available or alternatively, the network should activate this SAP (or configure/activate RLC-S) when it intends to send a DL RRC message via the SeNB L2 transport. UE implementation "can" ensure that SRB packets are delivered to RRC by L2 of MAC-M and MAC-S entities by having always a dedicated SAP between them. However, in one further alternative network may specifically control when the SRB from the SeNB L2 will be delivered by way of MAC or RRC level signalling (thereby sort of activating this link between the MAC-M and MAC-S entities).

In the UL however, since in normal circumstances, the RRC packets should not be unnecessarily duplicated and sent across 2 different links but only upon special conditions (using same/different RRC transaction identifiers) whereby RRC/PDCP can trigger/activate this in the lower layer and later come back to 1 link SRB transmission. This can be done by UE RRC when it needs to:

respond to a RRC Signalling message that was received on SeNB L2 link
  initiate a RRC Signalling message on SeNB L2 link when MeNB L2 link is not available due to Radio Link failure
  initiate a RRC Signalling message on MeNB L2 link when SeNB L2 link is not available due to Radio Link failure
  a critical information needs to be sent in the Uplink For the above enhancements related to SRB delivery via the L2 SeNB link, the network may need to configure relevant parameters in UE RRC and lower layers and enable MAC signalling when required. This network configuration may allow the duplication of RRC messages on the L2 SeNB link, use of MAC/RRC signalling for this purpose and even configure the scenarios where this new UE behavior would be required.

Hardware and Software Implementation of the Present Disclosure

Another embodiment of the present disclosure relates to the implementation of the above described various embodiments using hardware and software. In this connection the present disclosure provides a user equipment (mobile terminal) and eNodeBs (master and secondary base station). The user equipment is adapted to perform the methods described herein.

It is further recognized that the various embodiments of the present disclosure may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the present disclosure may also be performed or embodied by a combination of these devices.

Further, the various embodiments of the present disclosure may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the present disclosure may individually or in arbitrary combination be subject matter to another present disclosure.

It would be appreciated by a person skilled in the art that numerous variations and/or modifications may be made to the present disclosure as shown in the specific embodiments without departing from the spirit or scope of the present disclosure as broadly described. The present embodiments are, therefore, to be considered in all respects to be illustrative and not restrictive.

What is claimed is:

1. A communication system comprising:
  a mobile node;
  a master base station; and
  a secondary base station; wherein
  the mobile node comprises:
    circuitry, which, in operation,
      connects to the master base station and to the secondary base station via a split bearer that is split between the master base station and the secondary base station in a Packet Data Convergence Protocol (PDCP) layer;
      determines whether a total buffer occupancy of the PDCP layer in the mobile node exceeds a threshold;
      responsive to the total buffer occupancy exceeding the threshold, splits the total buffer occupancy of the PDCP layer into both a first PDCP buffer occupancy value for the master base station and a second PDCP buffer occupancy value for the secondary base station;
      responsive to the total buffer occupancy not exceeding the threshold, splits the total buffer occupancy of the PDCP layer based on a defined split ratio into a first PDCP buffer occupancy value for the master base station and a second PDCP buffer occupancy value for the secondary base station, wherein the defined split ratio is configured such that one of the first and second PDCP buffer occupancy values is equal to the total buffer occupancy, and the other one of the first and second PDCP buffer occupancy values is equal to zero; and a transmitter, which is coupled to the circuitry and which, in operation, transmits a first buffer status report based on the first PDCP buffer occupancy value to the master base station responsive to the first buffer occupancy value being more than zero, and a second buffer status report based on the second PDCP buffer occupancy value to the secondary base station responsive to the second buffer occupancy value being more than zero.

2. The communication system according to claim 1, wherein the defined split ratio is configured by a Radio Resource Control (RRC) message.

3. The communication system to claim 2, wherein the transmitter transmits all uplink data, processed by the PDCP layer, to either the master base station or to the secondary base station depending on the defined split ratio, with an exception of Radio Link Control (RLC) uplink data being transmitted to the master base station and to the secondary base station, respectively.

4. The communication system according to claim 1, wherein the defined split ratio is 1:0 or 0:1.

5. The communication system according to claim 1, wherein transmission of the first buffer status report to the master base station and transmission of the second buffer status report to the secondary base station are independent of each other.

6. The communication system according to claim 1, wherein the threshold is configured by a Radio Resource Control (RRC) message.

7. A method performed by a communication system comprising a mobile node, a master base station and a secondary base station, the method comprising:

the mobile node connecting to the master base station and to the secondary base station via a split bearer that is split between the master base station and the secondary base station in a Packet Data Convergence Protocol (PDCP) layer;

the mobile node determining whether a total buffer occupancy of the PDCP layer in the mobile node exceeds a threshold;

responsive to the total buffer occupancy exceeding the threshold, the mobile node splitting the total buffer occupancy of the PDCP layer into both a first PDCP buffer occupancy value for the master base station and a second PDCP buffer occupancy value for the secondary base station;

responsive to the total buffer occupancy not exceeding the threshold, the mobile node splitting the total buffer occupancy of the PDCP layer based on a defined split ratio into a first PDCP buffer occupancy value for the master base station and a second PDCP buffer occupancy value for the secondary base station, wherein the defined split ratio is configured such that one of the first and second PDCP buffer occupancy values is equal to the total buffer occupancy, and the other one of the first and second PDCP buffer occupancy values is equal to zero;

the mobile node transmitting a first buffer status report based on the first PDCP buffer occupancy value to the master base station responsive to the first buffer occupancy value being more than zero; and the mobile node transmitting a second buffer status report based on the second PDCP buffer occupancy value to the secondary base station responsive to the second buffer occupancy value being more than zero.

8. The method according to claim 7, wherein the defined split ratio is configured by a Radio Resource Control (RRC) message.

9. The method according to claim 8 comprising:

the mobile node transmitting all uplink data, processed by the PDCP layer, to either the master base station or to the secondary base station depending on the defined split ratio, with an exception of Radio Link Control (RLC) uplink data being transmitted to the master base station and to the secondary base station, respectively.

10. The method according to claim 7, wherein the defined split ratio is 1:0 or 0:1.

11. The method according to claim 7, wherein transmission of the first buffer status report to the master base station and transmission of the second buffer status report to the secondary base station are independent of each other.

12. The method according to claim 7, wherein the threshold is configured by a Radio Resource Control (RRC) message.

* * * * *